United States Patent
Tokoro et al.

(10) Patent No.: US 11,764,356 B2
(45) Date of Patent: Sep. 19, 2023

(54) METHOD FOR PRODUCING POSITIVE ELECTRODE ACTIVE MATERIAL FOR LITHIUM ION SECONDARY BATTERIES

(71) Applicant: Proterial, Ltd., Tokyo (JP)

(72) Inventors: Hisato Tokoro, Tokyo (JP); Takashi Nakabayashi, Tokyo (JP); Shuichi Takano, Tokyo (JP); Akira Gunji, Tokyo (JP); Tatsuya Tooyama, Tokyo (JP); Shin Takahashi, Tokyo (JP)

(73) Assignee: Proterial, Ltd., Tokyo (JP)

( * ) Notice: Subject to any disclaimer, the term of this patent is extended or adjusted under 35 U.S.C. 154(b) by 202 days.

(21) Appl. No.: 17/374,210

(22) Filed: Jul. 13, 2021

(65) Prior Publication Data

US 2021/0344007 A1 Nov. 4, 2021

Related U.S. Application Data

(62) Division of application No. 16/303,181, filed as application No. PCT/JP2017/016995 on Apr. 28, 2017, now abandoned.

(30) Foreign Application Priority Data

Jun. 23, 2016 (JP) ................................. 2016-124594

(51) Int. Cl.
  *H01M 4/505* (2010.01)
  *H01M 4/525* (2010.01)
  (Continued)

(52) U.S. Cl.
  CPC ............ *H01M 4/505* (2013.01); *C01G 53/50* (2013.01); *H01M 4/525* (2013.01);
  (Continued)

(58) Field of Classification Search
  CPC .................................................... H01M 4/505
  See application file for complete search history.

(56) References Cited

U.S. PATENT DOCUMENTS

| 5,393,622 A | 2/1995 | Nitta et al. |
| 10,381,686 B2 | 8/2019 | Katou et al. |

(Continued)

FOREIGN PATENT DOCUMENTS

| JP | 06-096768 A | 4/1994 |
| JP | 2003-059489 A | 2/2003 |

(Continued)

OTHER PUBLICATIONS

Korean Notice of Allowance dated Jul. 30, 2020 for Korean Application No. 10-2018-7033230.

(Continued)

*Primary Examiner* — William D Young
(74) *Attorney, Agent, or Firm* — Volpe Koenig

(57) ABSTRACT

Making a positive electrode active material for lithium ion secondary batteries includes: weighting and mixing lithium carbonate and a compound containing respective metallic elements other than Li in a composition formula $Li_\alpha Ni_x Co_y M2_{1-x-y-z} M2_z O_{2+\beta}$ so as to have a metallic constituent ratio of the formula to obtain a mixture, and firing the mixture to obtain a lithium composite compound. Performing, on the mixture, a first heat treatment at 200° C. to 400° C. for 0.5 to 5 hours to obtain a first precursor. A step of performing a heat treatment on the first precursor under an oxidizing atmosphere at 450° C. to 800° C. for 0.5 to 50 hours, and reacting 92 mass % or more of the lithium carbonate to obtain a second precursor, and a finishing step of performing a heat treatment on the second precursor under an oxidizing atmosphere at 755° C. to 900° C. for 0.5 to 50 hours to obtain the lithium composite compound.

8 Claims, 3 Drawing Sheets

(51) Int. Cl.
  *H01M 10/052* (2010.01)
  *C01G 53/00* (2006.01)
  *H01M 10/0525* (2010.01)
  *H01M 4/02* (2006.01)

(52) U.S. Cl.
  CPC ..... *H01M 10/052* (2013.01); *H01M 10/0525* (2013.01); *C01P 2002/77* (2013.01); *H01M 2004/028* (2013.01)

(56) References Cited

U.S. PATENT DOCUMENTS

| | | |
|---|---|---|
| 2009/0314985 A1 | 12/2009 | Malcus et al. |
| 2012/0012776 A1 | 1/2012 | Kagei et al. |
| 2015/0194673 A1* | 7/2015 | Takagi ............... H01M 4/505 427/126.6 |
| 2016/0006030 A1 | 1/2016 | Saka et al. |
| 2016/0156020 A1 | 6/2016 | Tokoro et al. |
| 2016/0351957 A1 | 12/2016 | Taeda et al. |
| 2017/0256794 A1 | 9/2017 | Tani et al. |

FOREIGN PATENT DOCUMENTS

| | | |
|---|---|---|
| JP | 2005-029424 A | 2/2005 |
| JP | 2010-505732 A | 2/2010 |
| JP | 2016-110982 A | 6/2016 |
| KR | 20150048122 A | 5/2015 |
| KR | 20160063982 A | 6/2016 |
| WO | 2012/132072 A1 | 10/2012 |
| WO | 2016/031677 A1 | 3/2016 |
| WO | 2019053406 A1 | 3/2019 |

OTHER PUBLICATIONS

International Search Report, PCT/JP2017/016995, dated Jul. 4, 2017, 2 pages.

* cited by examiner

METHOD FOR PRODUCING POSITIVE ELECTRODE ACTIVE MATERIAL FOR LITHIUM ION SECONDARY BATTERIES

CROSS REFERENCE TO RELATED APPLICATIONS

This application is a divisional application of U.S. patent application Ser. No. 16/303,181 filed Nov. 20, 2018 which claims the benefit of PCT/JP2017/016995 filed Apr. 28, 2017 and JP 2016-124594 filed Jun. 23, 2016, which are incorporated by reference as if fully set forth.

TECHNICAL FIELD

The present invention relates to a method for producing a positive electrode active material used for a positive electrode of a lithium ion secondary battery, the positive electrode active material, and a lithium ion secondary battery.

BACKGROUND ART

Conventionally, as typified by, for example, lithium ion secondary batteries, non-aqueous secondary batteries in which a non-aqueous electrolyte mediates an electrical conduction between electrodes have been used as secondary batteries. The lithium ion secondary battery is a secondary battery in which lithium ions are in charge of electrical conduction between electrodes in charge/discharge reactions. The lithium ion secondary battery features a high energy density and a small memory effect compared with other secondary batteries such as a nickel-hydrogen storage battery and a nickel-cadmium storage battery. Therefore, the lithium ion secondary battery has been expanding its application ranging from small power supplies for, for example, mobile electronic devices and household electrical equipment, stationary power supplies for, for example, electric power storage devices, uninterruptible power supply systems, and power leveling devices to medium and large power supplies such as driving power supplies for, for example, ships, railways, hybrid vehicles, and electric vehicles.

Especially, in the use of the lithium ion secondary batteries as the medium and large power supplies, a high energy density is required for the batteries. Positive electrodes and negative electrodes are required to have a high energy density to achieve the high energy density of the batteries; therefore, active materials used for the positive electrode and the negative electrode are required to have a high capacity. As a positive electrode active material having a high charge/discharge capacity, powder of a lithium composite compound expressed by a chemical formula of $LiM'O_2$ (M' indicates an element such as Ni, Co, and Mn) having an $\alpha$-NaFeO$_2$ type layered structure has been known. Since exhibiting a trend of increasing the capacity as especially a proportion of Ni increases, this positive electrode active material is expected as the positive electrode active material achieving the high-energy batteries.

There has been disclosed powder of a lithium-containing compound expressed by $Li_aNi_bM1_cM2_d(O)_2(SO_4)_x$ as such positive electrode active material and a method for producing the positive electrode active material (see the following Patent Literature 1). An object of the invention described in Patent Literature 1 is to provide lithium-mixed metal oxide with which secondary particles are not broken in a battery production (a positive electrode) and do not turn into powder. As means to achieve the object, the invention configures a difference in D 10 values between initial powder and powder after compression at 200 MPa measured in accordance with ASTM B 822, the standard formulated by American Society for Testing and Materials, to be 1.0 μm or less.

A production step of the powder of the lithium-containing compound described in Patent Literature 1 includes a step of preparing a coprecipitated nickel-containing precursor having a predetermined voidage and a step of mixing the nickel-containing precursor with a lithium-containing compound to obtain a precursor mixture. Example of this lithium-containing compound includes lithium carbonate, lithium hydroxide, lithium hydroxide monohydrate, lithium oxide, lithium nitrate, or a mixture of these substances. The production step further includes a step of heating the obtained precursor mixture to 200 to 1000° C. in multiple stages using carrier gas containing $CO_2$-non-containing ($CO_2$ content proportion: 0.5 ppm or less) oxygen to produce a powder product and a step of disintegrating the powder by ultrasonic wave and screening the disintegrated powder.

According to Patent Literature 1, a reaction control pertaining to a temperature holding stage in the above-described production step allows obtaining a product of no aggregation of secondary particles firmly sintered to one another. Patent Literature 1 discloses that this allows an elimination of a pulverization step that forms square-shaped particles with squares, which cause particles to break in a material floor under a high pressure in an electrode production.

There has been disclosed a production method that allows obtaining a high-capacity $Li_yNi_{(1-x)}Mn_xO_2$ (Here, the numbers of moles of x and y are $0 \leq x \leq 0.3$, $1.0 \leq y \leq 1.3$.) regarding a positive electrode active material for non-aqueous electrolyte secondary battery (see the following Patent Literature 2). The production method described in Patent Literature 2 employs a manganese compound equivalent to the number of moles of atoms of Mn indicated by x, a nickel compound equivalent to the number of moles of atoms of Ni indicated by 1-x, and a lithium compound equivalent to the number of moles of atoms of Li indicated by y as starting materials. This production method is a synthesis method that performs a first heat treatment after preliminarily drying these starting materials, obtains an intermediate through a temperature decrease process, and after that performs a second heat treatment again at a temperature different from that of the first heat treatment. The production method features that a processing atmosphere at firing is an oxidizing atmosphere (see claim 1 or a similar description). Patent Literature 2 discloses that the use of the above-described synthesis method ensures obtaining a positive electrode active material for non-aqueous electrolyte secondary battery having a high charge/discharge capacity (paragraph 0020).

Patent Literature 2 describes a $LiNO_3$ hydrate and $Li_2CO_3$ as examples of the lithium compounds as the starting materials (paragraph 0019). The production method described in Patent Literature 2 does not obtain the synthesis of $LiNiO_2$ having a space group R-3m structure directly from the starting materials, Ni and Li compounds, by a heat treatment, but obtains a final object via the intermediate. Since this intermediate has an oxygen close packing type similar to a NiO type mainly having a rhombohedral structure and further contains Li sites at positions close to Ni and O atoms, the intermediate is considered to be facilitated to change to the R-3m structure (see paragraphs 0022 and 0023 and a similar description). In a determination from X-ray diffraction diagrams illustrated in FIG. 7 and FIG. 9, in the case where, for example, an unreacted Li compound indicative of a crystalline structure different from that of the intermediate is contained, it is determined as improper (see paragraphs 0040 and 0050).

CITATION LIST

Patent Literature

Patent Literature 1: JP-T 2010-505732
Patent Literature 2: JP-A H6-96768 A

SUMMARY OF INVENTION

Technical Problem

A method for producing a positive electrode active material that fires a mixture of lithium carbonate with a compound containing Ni and produces a lithium composite compound with a high Ni concentration has the following problems. The lithium composite compound with the high Ni concentration here means, for example, a lithium composite compound having a layered structure in which an atom ratio (Ni/M') of Ni to M' in a chemical formula LiM'O$_2$ (M' is a metallic element containing Ni) in excess of 0.7.

For industrial mass production of the above-described lithium composite oxide with the high Ni concentration, the synthesis reaction needs to be progressed by the large amount and uniformly. However, it has been found that heating a mixture of lithium carbonate and a compound containing Ni generates a large amount of carbonic acid gas from the lithium carbonate; therefore, the uniform synthesis reaction by the large amount is inhibited. This is because a reverse reaction of the carbonic acid gas with the lithium composite compound with the high Ni concentration containing Ni$^{3+}$ much progresses easily. Additionally, an oxygen partial pressure lowers and a reaction that oxidizes an oxidation number of Ni from Ni$^{2+}$ to Ni$^{3+}$ is inhibited.

Especially, a problem such as the following has been found out. The lithium composite compound with the high Ni concentration in which an oxidization of Ni is insufficient substantially lowers the capacity in a secondary battery using a positive electrode containing the lithium composite compound as a positive electrode active material. It has been found out that also in the case where, for example, an unreacted Li compound indicative of a crystalline structure different from that of the intermediate is not observed in an X-ray diffraction diagram, there may be a case where a property as the positive electrode active material cannot be sufficiently obtained, and the oxidation reaction of Ni needs to be progressed with more certainty.

The present invention has been made in consideration of the problems, and an object of the present invention is to provide a method for producing a positive electrode active material that ensures industrially mass-producing positive electrode active materials containing lithium composite oxide with a high Ni concentration, the positive electrode active material, and a lithium ion secondary battery.

Solution to Problem

To achieve the object, a method for producing positive electrode active material for lithium ion secondary batteries of the present invention is a method for producing the positive electrode active material used for positive electrodes of the lithium ion secondary batteries. The method includes: a mixing step of weighting and mixing a lithium carbonate and a compound containing respective metallic elements other than Li in the following Formula (1) so as to have a metallic constituent ratio of a composition formula in the following Formula (1) to obtain a mixture; and a firing step of firing the mixture to obtain a lithium composite compound expressed by the following Formula (1). The firing step includes: a first precursor forming step of performing a heat treatment on the mixture at a heat treatment temperature of 200° C. or more and 400° C. or less for 0.5 hours or more and 5 hours or less to obtain a first precursor; a second precursor forming step of performing a heat treatment on the first precursor under an oxidizing atmosphere at a heat treatment temperature of 450° C. or more and 800° C. or less for 0.5 hours or more and 50 hours or less, the second precursor forming step reacting 92 mass % or more of the lithium carbonate to obtain a second precursor; and a finishing heat treatment step of performing a heat treatment on the second precursor under an oxidizing atmosphere at a heat treatment temperature of 755° C. or more and 900° C. or less for 0.5 hours or more and 50 hours or less to obtain the lithium composite compound.

$$Li_\alpha Ni_x Co_y M1_{1-x-y-z} M2_z O_{2+\beta} \qquad (1)$$

Note that values in the Formula (1) meet: $0.97 \leq \alpha \leq 1.08$, $-0.1 \leq \beta \leq 0.1$, $0.7 < x \leq 0.9$, $0.03 \leq y \leq 0.3$, $0 \leq z \leq 0.1$, and $0 < 1-x-y-z$, M1 is at least one kind of an element selected from the group consisting of Mn and Al, and M2 is at least one kind of an element selected from the group consisting of Mg, Ti, Zr, Mo, and Nb.

Advantageous Effects of Invention

With the present invention, a positive electrode active material containing lithium composite oxide with a high Ni concentration can be industrially mass-produced and further a service life of the positive electrode active material can be longer than those of conventional positive electrode active materials.

DESCRIPTION OF EMBODIMENTS

Figure 1:
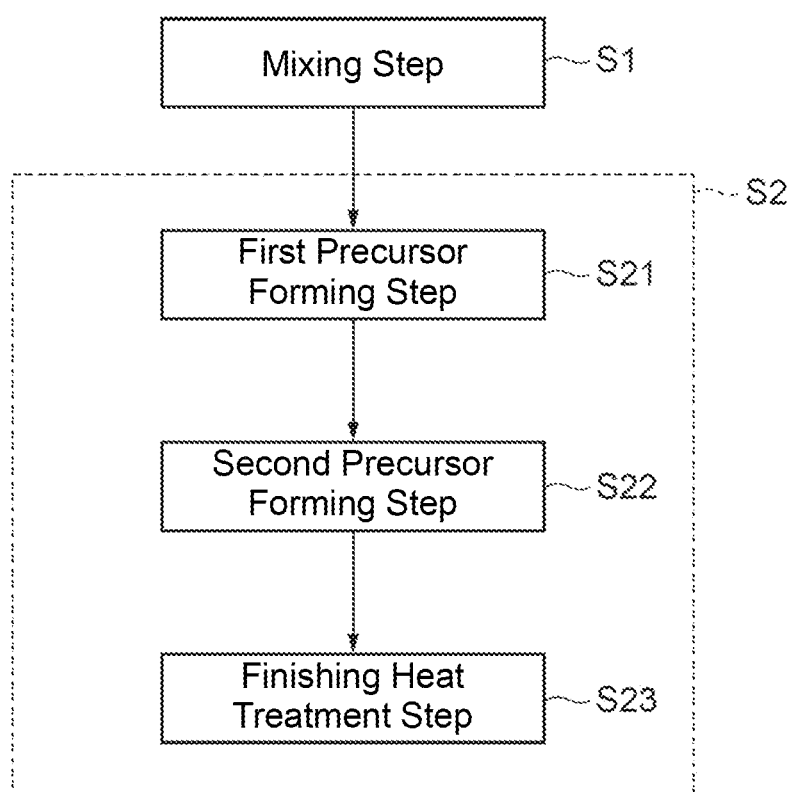
FIG. 1 is a flowchart of a method for producing a positive electrode active material according to an embodiment of the present invention.

The following describes embodiments of a method for producing a positive electrode active material and the positive electrode active material of the present invention in detail with reference to the drawings.

The method for producing a positive electrode active material of this embodiment is a method to produce the positive electrode active material used for a positive electrode of a non-aqueous secondary battery such as a lithium ion secondary battery. First, the following describes the positive electrode active material produced by the method for producing the positive electrode active material of this embodiment in detail, and next describes the method for producing the positive electrode active material of this embodiment in detail.

(Positive Electrode Active Material)

The positive electrode active material produced by the production method of this embodiment is a lithium composite compound having an α-NaFeO$_2$ type layered structure and expressed by the following Formula (1). The positive electrode active material contains, for example, the above-described powdery lithium composite compound with a specific surface area of 0.10 m$^2$/g or more.

$$Li_\alpha Ni_x Co_y M1_{1-x-y-z} M2_z O_{2+\beta} \quad (1)$$

Note that the values in the above-described Formula (1) meet: $0.97 \leq \alpha \leq 1.08$, $-0.1 \leq \beta \leq 0.1$, $0.7 < x \leq 0.9$, $0.03 \leq y \leq 0.3$, $0 \leq z \leq 0.1$, and $0 < 1-x-y-z$, M1 is at least one kind of an element selected from the group consisting of Mn and Al, and M2 is at least one kind of an element selected from the group consisting of Mg, Ti, Zr, Mo, and Nb.

The positive electrode active material made of the lithium composite compound having the α-NaFeO$_2$ type layered structure expressed by the above-described Formula (1) allows repetitive reversible insertion and detachment of lithium ions in association with charge and discharge and has a low resistance.

Particles of the lithium composite compound constituting the positive electrode active material may be primary particles where individual particles are separated, may be secondary particles where the plurality of primary particles are bonded by sintering or a similar method, or may be primary particles or secondary particles containing a free lithium compound.

The primary particles of the positive electrode active material preferably have an average grain diameter of, for example, 0.1 µm or more and 2 µm or less. Designing the average grain diameter of the primary particles of the positive electrode active material to be 2 µm or less improves a filling property of the positive electrode active material in the positive electrode when the positive electrode containing the positive electrode active material is produced, thereby ensuring producing the positive electrodes with a high energy density. From a similar aspect, the secondary particles of the positive electrode active material preferably have the average grain diameter of, for example, 3 µm or more and 50 µm or less.

By granulating the primary particles or the secondary particles of the positive electrode active material produced by the method for producing the positive electrode active material described later by dry granulation or wet granulation, the average grain diameter of the secondary particles can be adjusted. For example, a granulator such as a spray dryer and a tumbling fluidized bed device is available as granulation means.

In the above-described Formula (1), a indicates a content ratio of Li. The higher the content ratio of Li is, the higher a valence of transition metal before charge is, and the rate of change in the valence of the transition metal at Li detachment is lowered, ensuring improving charge/discharge cycle characteristics of the positive electrode active material. On the contrary, the higher the content ratio of Li is, the lower the charge/discharge capacity of the positive electrode active material is. Accordingly, the range of α indicative of an amount of excess/deficiency of Li in the above-described Formula (1) is designed to be 0.97 or more and 1.08 or less. This ensures improving the charge/discharge cycle characteristics of the positive electrode active material and reducing the decrease in the charge/discharge capacity.

More preferably, the range of a indicative of the content ratio of Li in the above-described Formula (1) can be designed to be 0.98 or more and 1.05 or less. As long as a in the above-described Formula (1) is 0.98 or more, the amount of Li sufficient to contribute to the charge and discharge is secured and the high-capacity positive electrode active material can be achieved. Additionally, as long as a in the above-described Formula (1) is 1.05 or less, a charge compensation can be sufficiently secured in case of the change in valence of the transition metal, and both the high capacity and the high charge/discharge cycle characteristics can be satisfied.

With x indicative of the content ratio of Ni in the above-described Formula (1) larger than 0.7, the amount of Ni preferable to contribute to the charge and discharge can be secured in the positive electrode active material, thereby ensuring achieving the high capacity. Meanwhile, with x in the above-described Formula (1) in excess of 0.9, a part of Ni is replaced by a Li site. This fails to secure the amount of Li sufficient to contribute to the charge and discharge and possibly lowers the charge/discharge capacity of the positive electrode active material. Accordingly, by designing x indicative of the content ratio of Ni in the above-described Formula (1) in the range of larger than 0.7 to 0.9 or less and more preferably in a range of larger than 0.75 to 0.85 or less, the positive electrode active material can have the high capacity and also the decrease in charge/discharge capacity can be reduced.

Additionally, as long as y indicative of the content ratio of Co in the above-described Formula (1) is 0.03 or more, this ensures contributing to stabilization of the layered structure of the positive electrode active material. Stably maintaining the layered structure allows reducing a cation mixing that mixes, for example, Ni into the Li sites; therefore, the excellent charge/discharge cycle characteristics can be obtained. Meanwhile, y in the above-described Formula (1) in excess of 0.3 relatively increases the ratio of Co, which is limited in the supply amount and has the high cost, being disadvantageous in terms of industrial production of the positive electrode active materials. Accordingly, by designing y indicative of the content ratio of Co in the above-described Formula (1) in the range of 0.03 or more to 0.3 or less, and more preferably in the range of larger than 0.05 to 0.2 or less, the charge/discharge cycle characteristics of the positive electrode active material can be improved, being advantageous in terms of the industrial mass production of the positive electrode active materials.

M1 in the above-described Formula (1) is at least one kind or more of elements selected from the group consisting of Mn and Al. Adding Mn or Al, or Mn and Al together provides an effect of stably maintaining the layered structure even when Li is detached by charging. However, 1-x-y-z indicative of a content ratio of at least one kind or more of elements selected from the group consisting of Mn and Al in the above-described Formula (1) of 0.30 or more lowers the capacity of the positive electrode active material.

M1 in the above-described Formula (1) is preferably Mn. This is because, with the M1 in the above-described Formula (1) being Mn, the layered structure can be further stably maintained even when Li is detached by charging and the capacity higher than the case of M1 being Al can be obtained. Designing 1-x-y-z indicative of the content ratio of Mn when M1 is Mn to be 0.04 or more ensures decreasing an average valence of Ni in LiM'O$_2$. Therefore, even when the oxidation reaction of Ni does not sufficiently progress, the reaction indicated in the following Formula (2) progresses, a reaction temperature lowers, and a reaction of lithium carbonate in a second precursor forming step described later is promoted. Since Al can take tetravalent similarly to Mn, an effect similar to that of Mn can be expected.

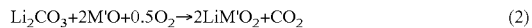

$$Li_2CO_3 + 2M'O + 0.5O_2 \rightarrow 2LiM'O_2 + CO_2 \quad (2)$$

Note that M' in the above-described Formula (2) indicates an element such as Ni, Co, and Mn. As described above, the promotion of the reaction of the lithium carbonate in the second precursor forming step lowers lithium carbonate melted and becoming a liquid phase in a finishing heat treatment step described later. This lowers an amount of liquid phase in the finishing heat treatment step and reduces a growth of crystal grains, making a high-temperature firing possible.

Furthermore, with M1 being Mn, designing 1-x-y-z indicative of the content ratio of Mn to be 0.04 or more allows the charge/discharge reactions even when a crystallite diameter and a primary particle diameter of the positive electrode active material are large, making the high heat treatment temperature in the finishing heat treatment step possible. Consequently, the Ni oxidation reaction is promoted in the finishing heat treatment step, a lithium compound remaining on a surface can be reduced, and lithium ions in the layered structure are stabilized.

With M1 being Mn, 1-x-y-z indicative of the content ratio of Mn in excess of 0.18 lowers the capacity of the positive electrode active material. Additionally, with M1 being Mn, designing 1-x-y-z indicative of the content ratio of Mn to be 0.10 or more allows the heat treatment temperature in the finishing temperature treatment step to be further high, and therefore is preferable. Accordingly, with M1 being Mn, 1-x-y-z indicative of the content ratio of Mn preferably meets $0.04 \le 1-x-y-z \le 0.18$.

Additionally, with M1 being Mn, y/(1-x-y-z) indicative of the ratio of the content ratios of Co to Mn is preferably 0.1 or more and 3 or less. y/(1-x-y-z) of 0.1 or more maintains the content ratio of Co in the preferable range and contributes to the stabilization of the layered structure. As long as y/(1-x-y-z) is 3 or less, the high reaction temperature of the above-described Formula (2) can be reduced and the reaction of the lithium carbonate can be sufficiently progressed in the second precursor forming step described later.

With M2 in the above-described Formula (1) containing at least one kind of a metallic element selected from the group consisting of Mg, Ti, Zr, Mo, and Nb, an electrochemical activity of the positive electrode active material can be enhanced. Replacing metal sites of the positive electrode active material with these metallic elements ensures improving stability of the crystalline structure of the positive electrode active material and an electrochemical property (such as the charge/discharge cycle characteristics) of the layered positive electrode active material. With z indicative of the content ratio of M2 in the above-described Formula (1) in excess of 0.1 lowers the capacity of the positive electrode active material. Accordingly, designing the range of z in the above-described Formula (1) to be 0 or more and 0.1 or less ensures further reducing the decrease in capacity of the positive electrode active material.

β in the above-described Formula (1) indicates an allowable range of a layered structure compound belonging to a space group R-3m and excess or deficiency amount of oxygen. The range of β in the above-described Formula (1) being the range of -0.1 or more and 0.1 or less ensures maintaining the layered structure of the positive electrode active material.

Additionally, a weight of lithium carbonate remaining on the surface of the positive electrode active material after the finishing heat treatment step is preferably 0.2 mass % or less. Designing the weight of the lithium carbonate remaining on the surface to be 0.2 mass % or less ensures reducing an amount of carbonic acid gas generated by lithium carbonate degradation caused by the charge/discharge cycles and ensures improving the charge/discharge cycle characteristics. The weight of the lithium carbonate remaining on the surface of the positive electrode active material after the finishing heat treatment step can be adjusted by, for example, performing a water washing step.

The weight of the lithium hydroxide remaining on the surface of the positive electrode active material is preferably 0.7 mass % or less. The lithium hydroxide generates hydrofluoric acid (HF) that exhibits strong acid through reaction to fluorine-based electrolyte contained in the electrolyte of the secondary battery. Further, the lithium hydroxide promotes an oxidative decomposition of the electrolyte by a high voltage. This deteriorates the performance of the secondary battery and makes it difficult to obtain the satisfactory charge/discharge cycle characteristics. Therefore, by designing the lithium hydroxide remaining on the surface of the positive electrode active material to be 0.7 mass % or less ensures obtaining the secondary battery having the satisfactory charge/discharge cycle characteristics.

The lithium compound remaining on the surface of the positive electrode active material can be quantitated by, for example, a Titration Method, a Temperature Programmed Desorption-Mass Spectrometry (TPD-MS), and Ion Chromatography (IC). The crystalline structure of the particles of the positive electrode active material can be confirmed by, for example, an X-ray diffraction method (XRD). An average composition of the particles of the positive electrode active material can be confirmed by, for example, an Inductively Coupled Plasma (ICP) and an Atomic Absorption Spectrometry (AAS).

The positive electrode active material of this embodiment is the positive electrode active material used for the positive electrode of the lithium ion secondary battery and features the following. The specific surface area is formed of 0.10 m²/g or more of the lithium composite compound expressed by the above-described Formula (1). An amount of dissolution of the lithium hydroxide is 0.33 mass % or less. In other words, the positive electrode active material of this embodiment is the positive electrode active material used for the positive electrode of the lithium ion secondary battery and features the following. The specific surface area is formed of 0.10 m²/g or more of the lithium composite compound expressed by the above-described Formula (1). An dissolution speed of the lithium hydroxide is 0.22 mass %/h or less. Here, the amount of dissolution of the lithium hydroxide is a difference between an amount of lithium hydroxide A and an amount of lithium hydroxide B, which is (B-A) mass %. The amount of lithium hydroxide A is detected after immersion of the positive electrode active material into pure water for 30 minutes at a solid content percentage of 1.6 mass % by neutralization titration. The amount of lithium hydroxide B is detected after immersion of the positive electrode active material into pure water for 120 minutes at a solid content percentage of 1.6 mass % by neutralization titration. The dissolution speed corresponding to this amount of dissolution is (B-A) mass %/1.5 h. The amount of dissolution of the lithium hydroxide is preferably less than 0.30 mass % and the dissolution speed of the lithium hydroxide is preferably less than 0.2 mass %/h.

By designing the specific surface area of the positive electrode active material to be 0.10 m²/g or more, the average grain diameters of the primary particles and the secondary particles of the positive electrode active material can fall within the above-described preferable ranges. The specific surface area of the positive electrode active material is preferable to be 2.0 m²/g or less. This ensures improving the filling property of the positive electrode active material in the positive electrode and producing the positive electrode with the high energy density. The positive electrode active material having the specific surface area of 0.8 m²/g or more and 1.2 m²/g or less is more preferable. The specific surface area of the positive electrode active material is a specific surface area that can be measured using, for example, an automatic specific surface area measuring apparatus and calculated by a BET method.

As long as the amount of dissolution (B−A) of the lithium hydroxide in the positive electrode active material of 0.33 mass % or less or the dissolution speed of the lithium hydroxide is 0.22 mass %/h or less, the layered structure is stabilized, thus ensuring obtaining the satisfactory charge/discharge cycle characteristics. Meanwhile, with the amount of dissolution (B−A) of the lithium hydroxide in the positive electrode active material in excess of 0.33 mass % or the dissolution speed of the lithium hydroxide in excess of 0.22 mass %/h, the layered structure is destabilized, making it difficult to obtain the satisfactory charge/discharge cycle characteristics.

A particle fracture strength of the positive electrode active material is preferably 10 MPa or more and 200 MPa or less. This does not fracture the particles of the positive electrode active material in the process of manufacturing the electrodes and reduces a poor coating such as peeling when slurry containing the positive electrode active material is coated over the surface of a positive electrode current collector to form a positive electrode mixture layer. The particle fracture strength per particle of the positive electrode active material can be measured using, for example, a microcompression testing machine.

A molding density of the positive electrode active material at a press pressure of 5 MPa is preferably 2.5 g/cm³ or more. How much the electric energy can be accumulated per unit volume depends on how the electrode density is configured to be a high density. When the molding densities, which are densities when powder molding is performed at the identical pressure, are compared, as the molding density becomes high, the powder is better in compressibility. The compressibility of the positive electrode active material can be evaluated by, for example, performing a compression test with an autograph and measuring the molding density.

(Method for Producing Positive Electrode Active Material)

Next, the following describes the method for producing the positive electrode active material of this embodiment that produces the above-described positive electrode active material. FIG. 1 is a flowchart illustrating respective steps included in the method for producing the positive electrode active material of this embodiment.

The method for producing the positive electrode active material of this embodiment is a method for producing the positive electrode active material used for the positive electrode in the lithium ion secondary battery. The method for producing the positive electrode active material of this embodiment mainly includes a mixing step S1 and a firing step S2. The mixing step S1 weights and mixes the lithium carbonate and the compound containing the respective metallic elements other than Li in the above-described Formula (1) so as to be the metallic constituent ratio of the composition formula of the above-described Formula (1) to obtain a mixture. The firing step S2 fires the mixture obtained at the mixing step S1 to obtain the lithium composite compound expressed by Formula (1).

The mixing step S1 can employ a compound containing the metallic elements other than Li in the above-described Formula (1), for example, a Ni-containing compound, a Co-containing compound, an Mn-containing compound, an Al-containing compound, and an M2-containing compound as starting materials of the positive electrode active material, in addition to the lithium carbonate. The M2-containing compound is a compound containing at least one kind of a metallic element selected from the group consisting of Mg, Ti, Zr, Mo, and Nb.

At the mixing step S1, the starting material weighted at the proportion so as to be the predetermined element composition corresponding to the above-described Formula (1) is mixed to prepare raw material powder. The method for producing the positive electrode active material of this embodiment uses the lithium carbonate as the starting material containing Li. Compared with other Li-containing compounds, such as lithium acetate, lithium nitrate, lithium hydroxide, lithium chloride, and lithium sulfate, the lithium carbonate is excellent in stability in supply, a low cost, and weak alkali; therefore, damage to manufacturing equipment is little and industrial utilization and usefulness are excellent.

As the Ni-containing compound, the Co-containing compound, the Mn-containing compound, and the Al-containing compound as the starting materials of the positive electrode active material, for example, oxide, hydroxide, carbonate, hydrosulfate, or acetate is available, and the use of oxide, hydroxide, or carbonate is especially preferable. As the M2-containing compound, for example, acetate, nitrate, carbonate, hydrosulfate, oxide, or hydroxide is available, and the use of carbonate, oxide, or hydroxide is especially preferable.

At the mixing step S1, the starting material is preferably pulverized by, for example, a pulverizer and mixed. This ensures preparing a uniformly-mixed powdery solid mixture. The starting material is preferably pulverized to have the average grain diameter of 0.3 μm or less, and further preferably pulverized to have the average grain diameter of 0.15 μm or less. As the pulverizer, which pulverizes the compound of the starting material, a general precision pulverizer such as a ball mill, a jet mill, and a sand mill is available. A granulation step can employ, for example, a spray drying method. Various kinds of methods such as a two-fluid or a four-fluid nozzle and a disk type are employable as a spray method in the spray drying method.

The firing step S2 is a step of obtaining the lithium composite compound expressed by the above-described Formula (1) through firing of the mixture obtained at the mixing step S1 and includes a first precursor forming step S21, a second precursor forming step S22, and a finishing heat treatment step S23.

The first precursor forming step S21 obtains a first precursor through a heat treatment of the mixture at a heat treatment temperature of 200° C. or more and 400° C. or less for 0.5 hours or more and 5 hours or less. The main purpose of the first precursor forming step S21 is to remove a vaporized component such as water content, which inhibits a synthesis reaction of the positive electrode active material, from the mixture obtained at the mixing step S1. That is, the first precursor forming step S21 is a heat treatment step for dehydration that removes the water content in the mixture.

At the first precursor forming step S21, the vaporized component contained in the heat-treated mixture such as water content, impurities, and a volatile component in association with a pyrolysis, for example, evaporates, burns, and volatilizes, and gas is generated. Since the heat-treated mixture contains carbonate such as the lithium carbonate, carbonic acid gas in association with a pyrolysis of the carbonate is also generated in the first precursor forming step S21.

At the first precursor forming step S21, the heat treatment temperature of less than 200° C. possibly results in insufficient burning reaction of the impurities and insufficient pyrolysis reaction of the starting material. At the first precursor forming step S21, the heat treatment temperature in excess of 400° C. possibly forms the layered structure of the lithium composite compound under an atmosphere containing the gas generated from the mixture by the heat treatment. Accordingly, the heat treatment of the mixture at the heat treatment temperature of 200° C. or more and 400° C. or less in the first precursor forming step S21 ensures sufficiently removing the vaporized component such as the water content and obtaining the first precursor in which the layered structure has not been formed yet.

As long as the heat treatment temperature is in the range of 250° C. or more and 400° C. or less and more preferably 250° C. or more and 380° C. or less in the first precursor forming step S21, the removal effect of the vaporized component such as the water content and the effect of reducing the formation of the layered structure can be further improved. A heat treatment period in the first precursor forming step S21 can be appropriately changed according to, for example, the heat treatment temperature, a degree of removal of the vaporized component, and a degree of reduction of the formation of the layered structure.

The first precursor forming step S21 preferably performs the heat treatment in an air current of atmosphere gas and under exhaust with a pump in order to exhaust the gas generated from the heat-treated mixture. A flow rate of the atmosphere gas per minute or an amount of exhaust per minute with the pump is preferably larger than the volume of the gas generated from the mixture. The volume of the gas generated from the heat-treated mixture in the first precursor forming step S21 can be calculated based on, for example, a ratio of the vaporized component to the mass of the starting material contained in the mixture.

The first precursor forming step S21 may be performed under a reduced pressure at an atmospheric pressure or less. Since the main purpose of the first precursor forming step S21 is not the oxidation reaction, an oxidizing atmosphere in the first precursor forming step S21 may be the atmosphere. The use of the atmosphere as the oxidizing atmosphere in the first precursor forming step S21 allows simplifying a configuration of a heat treatment apparatus, facilitating the supply of the atmosphere, improving the productivity of the positive electrode active materials, and lowering the production cost. The atmosphere for the heat treatment in the first precursor forming step S21 is not limited to the oxidizing atmosphere and may be a non-oxidizing atmosphere such as inert gas.

While the firing step S2 performs the second precursor forming step S22 after the termination of the first precursor forming step S21, the oxidizing atmosphere used at the first precursor forming step S21 may be exhausted after the termination of the first precursor forming step S21, and the second precursor forming step may be performed by introducing a new oxidizing atmosphere. Thus performing the gas replacement allows preventing the gas generated from the mixture of the starting material by the heat treatment at the first precursor forming step S21 from affecting the second precursor forming step S22. The first precursor may be once taken out from the heat treatment apparatus after the first precursor forming step S21, and the first precursor may be put into the heat treatment apparatus again. In the case where the exhaust is performed at the heat treatment or after the heat treatment in the first precursor forming step S21, the first precursor forming step S21 and the second precursor forming step S22 may be consecutively performed.

The second precursor forming step S22 performs the heat treatment on the first precursor obtained at the first precursor forming step S21 at the heat treatment temperature of 450° C. or more and 800° C. or less for 0.5 hours or more and 50 hours or less under the oxidizing atmosphere and causes 92 mass % or more of the lithium carbonate to react, thus obtaining a second precursor. The main purpose of the second precursor forming step S22 is to transform the lithium carbonate in the first precursor into lithium oxide, cause the lithium carbonate to react to transition metal, synthesize a compound having a layered structure expressed by a composition formula $LiM'O_2$, and remove a carbonic acid component. That is, the second precursor forming step S22 is a heat treatment step that removes the carbonic acid component in the first precursor.

To develop the positive electrode active material with the high Ni concentration in which the range of x indicative of the content ratio of Ni in the above-described Formula (1) is larger than 0.7 and 0.9 or less into the high capacity, the valence of Ni needs to be oxidized from a bivalence to a trivalent in the firing step S2. The bivalent Ni easily occupies the Li positions in the layered structure $LiM'O_2$, causing a decrease in the capacity of the positive electrode active material. Therefore, the firing step S2 fires the mixture obtained at the mixing step S1 under the oxidizing atmosphere to change an oxidation number of Ni from $Ni^{2+}$ to $Ni^{3+}$. The carbonic acid gas inhibits the progress of the reaction of the above-described Formula (2), casing the low capacity of the positive electrode active material. Therefore, the firing step S2 preferably performs the firing under the atmosphere not containing the carbonic acid gas as much as possible.

To promote the Ni oxidation reaction at the finishing heat treatment step S23, the second precursor forming step S22 degrades the lithium carbonate as the main carbonic acid gas source to lower an amount of generated carbonic acid gas in the finishing heat treatment step S23 as much as possible. To promote the reaction of the above-described Formula (2), the atmosphere for the heat treatment in the second precursor forming step S22 is an oxidizing atmosphere containing oxygen and the oxygen concentration is preferably 80% or more, the oxygen concentration of 90% or more is more preferable, the oxygen concentration of 95% or more is further preferable, and the oxygen concentration of 100% is yet further preferable. The carbonic acid gas concentration under the atmosphere for the heat treatment in the second precursor forming step S22 is preferably 5% or less, 1% or less is more preferable, and 0.1% or less is further preferable. For successive progress of the reaction of the above-described Formula (2), consecutively supplying the oxygen at the heat treatment in the second precursor forming step S22 is preferable, and performing the heat treatment in the air current of the oxidizing atmosphere gas is preferable.

To smoothly progress the Ni oxidation reaction in the second precursor in the finishing heat treatment step S23, the second precursor forming step S22 needs to sufficiently lower a residue derived from the starting material. Accordingly, the second precursor forming step S22 reacts 92 mass % or more of the lithium carbonate contained in the mixture weighed and mixed so as to have the metallic constituent ratio of the composition formula of the above-described Formula (1). When the second precursor forming step S22 reacts 92 mass % or more of the lithium carbonate contained in the mixture, the amount of generated carbonic acid gas in the finishing heat treatment step S23 can be lowered, and the reaction of the above-described Formula (2) and the oxidation reaction of Ni can be promoted.

Furthermore, when the second precursor forming step S22 reacts 92 mass % or more of the lithium carbonate contained in the mixture, an amount of liquid phase of the lithium carbonate being melted and becoming the liquid phase is lowered in the finishing heat treatment step S23, and a growth of crystal grains is reduced, making the high temperature firing possible. Performing the finishing heat treatment step S23 at a higher temperature promotes the Ni oxidation reaction; therefore, the lithium compound remaining on the surface can be reduced, and the lithium ions in the layered structure are stabilized. Consequently, the positive electrode active material having the satisfactory charge/discharge cycle characteristics is obtained. The second precursor forming step S22 preferably reacts 97 mass % or more of the lithium carbonate contained in the mixture. When the second precursor forming step S22 reacts 97 mass % or more of the lithium carbonate contained in the mixture, the amount of generated carbonic acid gas can be further lowered in the finishing heat treatment step S23 and the positive electrode active material having the more satisfactory charge/discharge cycle characteristics can be obtained.

In the case where lithium salt other than the lithium carbonate is used as a part of the starting material of the lithium contained in the positive electrode active material, a proportion of the lithium present as the lithium carbonate is preferably less than 7 mole % among the lithium components in the second precursor. This allows the amount of generated carbonic acid gas to be lowered in the finishing heat treatment step S23, and the reaction of the above-described Formula (2) and the oxidation reaction of Ni can be promoted. Additionally, in this case, the amount of liquid phase of the lithium carbonate is lowered and the growth of the crystal grains is reduced, making the high temperature firing possible in the finishing heat treatment step S23. As described above, the positive electrode active material having the satisfactory charge/discharge cycle characteristics can be obtained.

In the case where lithium salt other than the lithium carbonate is used as a part of the starting material of the lithium contained in the positive electrode active material, a proportion of the lithium present as the lithium carbonate is more preferably less than 3 mole % among the lithium components in the second precursor. Accordingly, the amount of generated carbonic acid gas can be further lowered in the finishing heat treatment step S23 and the positive electrode active material having the more satisfactory charge/discharge cycle characteristics can be obtained.

The heat treatment temperature in the second precursor forming step S22 of less than 450° C. results in considerably slow progress of the formation reaction of the layered structure and excessively remaining lithium carbonate while the first precursor is heat-treated to form the second precursor having the layered structure. Meanwhile, the heat treatment temperature in the second precursor forming step S22 in excess of 800° C. excessively progresses the grain growth, failing to obtain the high-capacity positive electrode active material. Accordingly, the heat treatment temperature in the second precursor forming step S22 is preferably higher than 550° C., more preferably 600° C. or more and 700° C. or less, and further preferably a high temperature, 650° C. or more and 680° C. or less. Since the reaction of 92 mass % or more of the lithium carbonate and preferably 97 mass % or more of the lithium carbonate can be further promoted, the heat treatment temperature and/or the ratio of Mn in the second precursor forming step S22 is preferably set to high. Specifically, setting the heat treatment temperature in the second precursor forming step S22 to be higher than 550° C. ensures the further promoted reaction of the lithium carbonate. In the case where M1 in the above-described Formula (1) is Mn and 1-x-y-z is larger than 0 and smaller than 0.075, the heat treatment temperature is preferably 600° C. or more, and in the case where 1-x-y-z is 0.075 or more, the heat treatment temperature is preferably higher than 550° C. The high ratio of Mn allows decreasing the average valence of Ni in $LiM'O_2$. Even when the oxidation reaction of Ni does not sufficiently progress, the reaction indicated by the above-described Formula (2) progresses and the reaction temperature lowers; therefore, the reaction of the lithium carbonate in the second precursor forming step S22 is promoted. Therefore, in the case where M1 in the above-described Formula (1) is Mn and 1-x-y-z is larger than 0 and smaller than 0.075, the heat treatment temperature is set to 600° C. or more, and in the case where 1-x-y-z is 0.075 or more, the heat treatment temperature is set to be higher than 550° C. This ensures the reaction of 92 mass % or more of the lithium carbonate contained in the mixture and therefore is preferable. Meanwhile, setting the heat treatment temperature in the second precursor forming step S22 to be 700° C. or less ensures reducing generation of the liquid phase and further improving the reduction effect of the growth of the crystal grains.

To fully react the first precursor to the oxygen in the temperature range of the heat treatment in the second precursor forming step S22, the period of the heat treatment can be set to 0.5 hours or more and 50 hours or less. From an aspect of promoting the reaction of the lithium carbonate, the period of the heat treatment in the second precursor forming step S22 is preferably two hours or more and 50 hours or less. From an aspect of improving the productivity, the period of the heat treatment in the second precursor forming step S22 is more preferably two hours or more and 15 hours or less.

While the firing step S2 performs the finishing heat treatment step S23 after the termination of the second precursor forming step S22, the oxidizing atmosphere used at the second precursor forming step S22 may be exhausted after the termination of the second precursor forming step S22, and the finishing heat treatment step S23 may be performed by introducing a new oxidizing atmosphere. This allows preventing the gas generated by the heat treatment in the second precursor forming step S22 from affecting the finishing heat treatment step S23. The second precursor may be once taken out from the heat treatment apparatus after the termination of the second precursor forming step S22, and the second precursor may be put into the heat treatment apparatus again. In the case where the exhaust is performed at the heat treatment or after the heat treatment in the second precursor forming step S22, the second precursor forming step S22 and the finishing heat treatment step S23 may be consecutively performed. The second precursor forming step can use, for example, a continuous conveyance furnace and a rotary kiln.

The finishing heat treatment step S23 performs the heat treatment on the second precursor obtained in the second precursor forming step S22 at the heat treatment temperature of 755° C. or more and 900° C. or less for 0.5 hours or more and 50 hours or less under the oxidizing atmosphere, thus obtaining the lithium composite compound. The lithium composite compound obtained in this finishing heat treatment step S23 constitutes the positive electrode active material of this embodiment. The main purpose of the finishing heat treatment step S23 is to grow the crystal grains to fully progress the Ni oxidation reaction, which oxidizes Ni in the second precursor obtained at the second precursor forming step S22 from the bivalence to the trivalent, and to develop electrode performance of the lithium composite compound obtained by the heat treatment. That is, the finishing heat treatment step S23 is a heat treatment step that performs the Ni oxidation reaction in the second precursor and the crystal grain growth.

To fully progress the Ni oxidation reaction in the second precursor in the finishing heat treatment step S23, the atmosphere for the heat treatment in the finishing heat treatment step S23 is an oxidizing atmosphere containing oxygen. In the oxidizing atmosphere in the finishing heat treatment step S23, the oxygen concentration is preferably 80% or more, the oxygen concentration of 90% or more is more preferable, the oxygen concentration of 95% or more is further preferable, and the oxygen concentration of 100% is yet further preferable. The carbonic acid gas concentration under the atmosphere for the heat treatment in the second precursor forming step S22 is preferably 5% or less, 1% or less is more preferable, and 0.1% or less is further preferable.

The heat treatment temperature in the finishing heat treatment step S23 of less than 755° C. possibly makes the progress of the crystallization of the second precursor difficult. The heat treatment temperature in excess of 900° C. fails to reduce the degradation of the layered structure in the second precursor and generates the bivalent Ni, thereby lowering the capacity of the obtained lithium composite compound. Accordingly, setting the heat treatment temperature in the finishing heat treatment step S23 to 755° C. or more and 900° C. or less promotes the grain growth of the second precursor. Additionally, the degradation of the layered structure is reduced and the capacity of the obtained lithium composite compound can be improved. When the heat treatment temperature in the finishing heat treatment step S23 is set to be higher than 800° C., preferably 840° C. or more and 890° C. or less, and more preferably in excess of 850° C. and 890° C. or less, the promotion effect of the grain growth and the degradation reduction effect of the layered structure can be further improved.

A low oxygen partial pressure in the finishing heat treatment step S23 promotes the Ni oxidation reaction and therefore heat is required. Accordingly, in the case where the oxygen supply to the second precursor is insufficient in the finishing heat treatment step S23, the heat treatment temperature needs to be increased. The increase in the heat treatment temperature cannot avoid the degradation of the layered structure in the obtained lithium composite compound, failing to obtain the satisfactory electrode property of the positive electrode active material. Accordingly, to fully supply the oxygen to the second precursor in the finishing heat treatment step S23, the period of the heat treatment in the finishing heat treatment step S23 can be set to 0.5 hours or more and 50 hours or less. From an aspect of improving the productivity of the positive electrode active material, the period of the heat treatment in the finishing heat treatment step S23 is preferably 0.5 hours or more and 15 hours or less.

From an aspect of the production process, the obtained lithium composite compound is preferably not washed with water after the finishing heat treatment step S23. While performing the water washing allows decreasing the lithium compound remaining on the surface, the water possibly extracts the lithium in the positive electrode active material other than the lithium remaining on the positive electrode active material surface, leading to deterioration of the property of the positive electrode active material. The water content remained after the water washing degenerates a binder during the positive electrode production and possibly causes the poor coating. Entering the remaining water content in the battery causes the water content to react to the electrolyte. This generates hydrogen fluoride and possibly deteriorates the battery property.

However, it has been found that, from an aspect of performance improvement in the positive electrode active material, the water washing of the obtained lithium composite compound after the finishing heat treatment step S23 is advantageous. That is, it has been found out that providing the step of water washing after the finishing heat treatment step S23 improves the compression property of the powder of the positive electrode active material. This will be described later.

As described above, in the method for producing the positive electrode active material of this embodiment, the firing step S2, which fires the mixture obtained at the mixing step S1, includes the first precursor forming step S21, the second precursor forming step S22, and the finishing heat treatment step S23. This ensures obtaining the first precursor in which the vaporized component, mainly such as the water content, has been removed from the mixture in the first precursor forming step S21. Then, the second precursor forming step S22 performs the heat treatment on the first precursor to fully generate the carbonic acid gas, and reacts 92 mass % or more of the lithium carbonate in the second precursor, thereby ensuring obtaining the second precursor in which the generation of the carbonic acid gas by heating is reduced.

The reaction of 92 mass % or more of the lithium carbonate in the second precursor allows the high heat treatment temperature in the finishing heat treatment step S23. Consequently, the oxidation reaction of Ni is promoted, the oxidation number of Ni changes from $Ni^{3+}$ to $Ni^{3+}$, the lithium compound remaining on the surface of the positive electrode active material can be lowered, and the lithium ions in the layered structure are stabilized. Therefore, the positive electrode active material having the satisfactory charge/discharge cycle characteristics can be obtained.

Furthermore, the high heat treatment temperature becomes possible in the finishing heat treatment step S23, and the generation of the carbonic acid gas from the second precursor is reduced. Accordingly, the low oxygen partial pressure under the oxidizing atmosphere is suppressed, the large amount of Ni oxidation reaction in the second precursor uniformly progresses, and the growth of the crystal grains progresses. Accordingly, the method for producing the positive electrode active material of this embodiment can decrease the bivalent Ni remaining in the lithium composite compound with the high Ni concentration having the layered structure, change the bivalent Ni to the trivalent Ni, and obtain the high-capacity positive electrode active material excellent in a capacity retention rate.

The method for producing the positive electrode active material of this embodiment brings the significant effect when the weight of the produced positive electrode active material becomes a large amount, for example, several hundred g or more. This is because, when the weight of the produced positive electrode active material is several g, the influence from the gas generated from the starting material in the firing step S2 is small; however, when the positive electrode active materials are mass-produced in an industrial scale, the volume of the gas generated from the starting material in the firing step S2 increases, and this is likely to lower the oxygen partial pressure under the oxidizing atmosphere.

When the first precursor forming step S21 is omitted in the firing step S2, the oxygen partial pressure lowers in the second precursor forming step S22 and the finishing heat treatment step S23. As a result, in order to sufficiently progress the formation reaction of the layered structure of the lithium composite compound, which involves the oxidation of Ni, the finishing heat treatment would need to be performed at a higher temperature, and therefore the preferable temperature range would be exceeded. Additionally, when the second precursor forming step S22 is omitted, the grain growth in the lithium composite compound progresses with the insufficient oxidation reaction of Ni and therefore the omission is not preferable. Further, omitting the finishing heat treatment step S23 fails to obtain the appropriate electrode property.

(Positive Electrode and Lithium Ion Secondary Battery)

Figure 2:
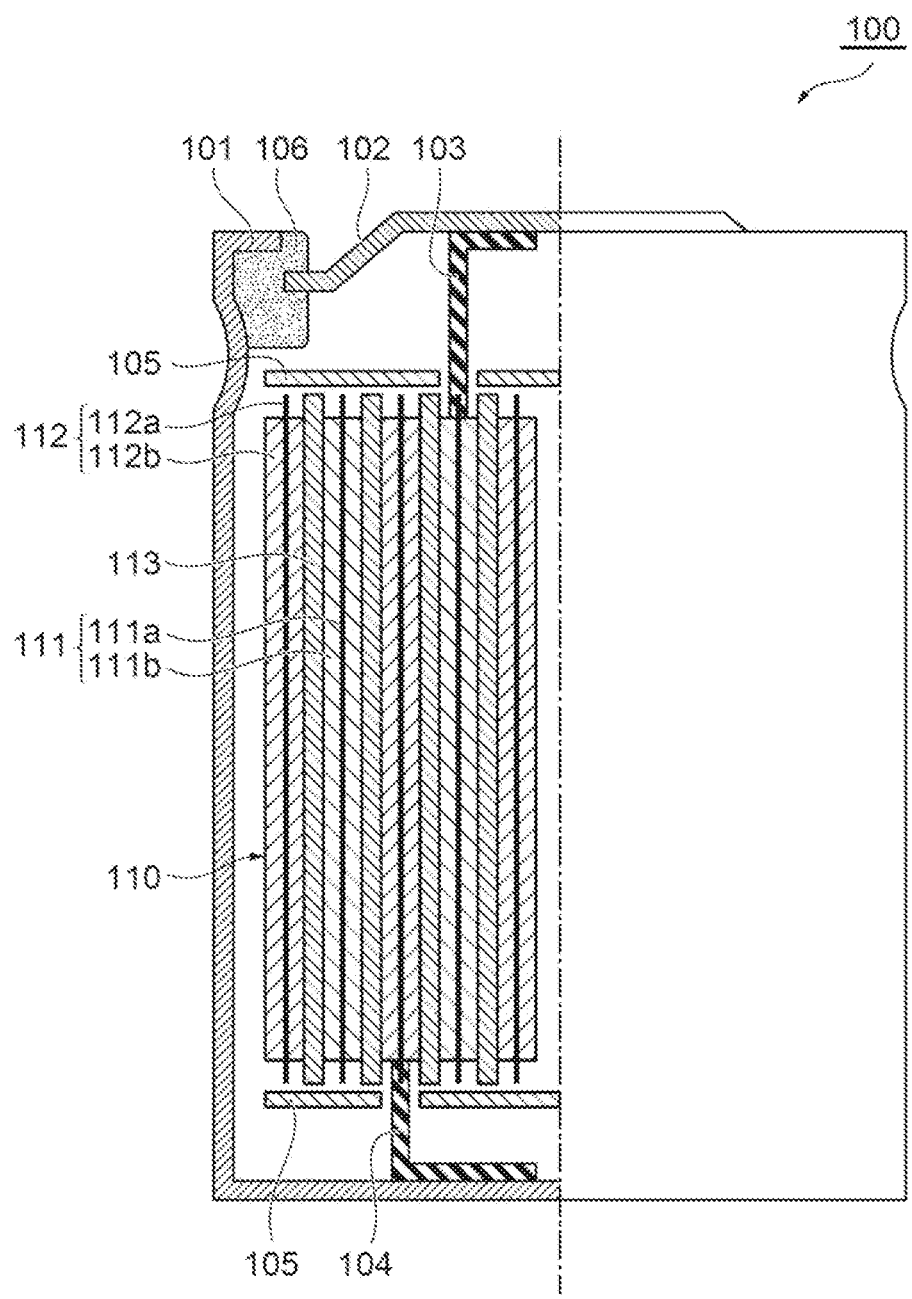
FIG. 2 is a schematic partial cross-sectional view of a secondary battery containing a positive electrode active material according to the embodiment of the present invention.

The following describes a positive electrode for a non-aqueous secondary battery using the positive electrode active material produced by the above-described method for producing the positive electrode active material and a configuration of the non-aqueous secondary battery that includes the positive electrode. FIG. 2 is a schematic partial cross-sectional view of a positive electrode 111 of this embodiment and a non-aqueous secondary battery 100 including the positive electrode 111.

The non-aqueous secondary battery 100 of this embodiment is, for example, a cylindrical lithium ion secondary battery. The non-aqueous secondary battery 100 includes a cylindrical battery can 101 with a closed bottom that houses non-aqueous electrolyte, a wound electrode group 110 housed in the battery can 101, and a circular plate-shaped battery lid 102 that seals an upper opening of the battery can 101. The battery can 101 and the battery lid 102 are, for example, manufactured of a metallic material such as stainless steel and aluminum. The battery lid 102 is fixed to the battery can 101 via a sealing material 106 made of a resin material having an insulating property by a crimping or a similar method. This seals the battery can 101 with the battery lid 102, and the battery can 101 and the battery lid 102 are mutually electrically insulated. The shape of the non-aqueous secondary battery 100 is not limited to the cylindrical shape, and any other shapes such as a square shape, a button shape, and a laminated sheet shape are employable.

The wound electrode group 110 is manufactured by winding a long strip-shaped positive electrode 111 and negative electrode 112, which are opposed via a long strip-shaped separator 113, around the winding center axis. In the wound electrode group 110, a positive electrode current collector 111a is electrically connected to the battery lid 102 via a positive electrode lead piece 103, and a negative electrode current collector 112a is electrically connected to a bottom portion of the battery can 101 via a negative electrode lead piece 104. An insulating plate 105 that prevents short-circuit is located between the wound electrode group 110 and the battery lid 102 and between the wound electrode group 110 and the bottom portion of the battery can 101. The positive electrode lead piece 103 and the negative electrode lead piece 104 are members for current extraction manufactured of materials similar to those of the positive electrode current collector 111a and the negative electrode current collector 112a, respectively, and are joined to the positive electrode current collector 111a and the negative electrode current collector 112a by a spot welding, an ultrasonic pressure welding, or a similar method, respectively.

The positive electrode 111 of this embodiment includes the positive electrode current collector 111a and a positive electrode mixture layer 111b, which is formed on the surface of the positive electrode current collector 111a. As the positive electrode current collector 111a, for example, a metal foil, an expanded metal, and a perforated metal made of, for example, aluminum or an aluminum alloy are available. The metal foil can be configured to have a thickness of, for example, around 15 μm or more and 25 μm or less. The positive electrode mixture layer 111b contains the positive electrode active material produced by the above-described method for producing the positive electrode active material. The positive electrode mixture layer 111b may contain a conductive material, a binder, or a similar material.

The negative electrode 112 includes the negative electrode current collector 112a and a negative electrode mixture layer 112b, which is formed on the surface of the negative electrode current collector 112a. As the negative electrode current collector 112a, for example, a metal foil, an expanded metal, and a perforated metal made of, for example, copper or a copper alloy or nickel or a nickel alloy are available. The metal foil can be configured to have a thickness of, for example, around 7 μm or more and 10 μm or less. The negative electrode mixture layer 112b contains a negative electrode active material used for the general lithium ion secondary batteries. The negative electrode mixture layer 112b may contain a conductive material, a binder, or a similar material.

As the negative electrode active material, for example, one kind or more of materials such as a carbon material, a metallic material, and a metal oxide material are available. As the carbon material, for example, graphites such as natural graphite and artificial graphite, carbides such as coke and pitch, amorphous carbon, and carbon fiber are available. As the metallic material, lithium, silicon, tin, aluminum, indium, gallium, magnesium, and an alloy of these substances, and as the metal oxide material, metal oxide containing, for example, tin, silicon, lithium, and titanium are available.

As the separator 113, for example, a polyolefin-based resin such as polyethylene, polypropylene, and polyethylene-polypropylene copolymer, a microporous film such as polyamide resin and aramid resin, and nonwoven fabric are available.

The positive electrode 111 and the negative electrode 112 can be produced through, for example, a mixture preparing step, a mixture coating step, and a molding step. The mixture preparing step uses, for example, stirring means such as a planetary mixer, a dispersion mixer, and a rotating and revolving mixer to stir and homogenize a positive electrode active material or a negative electrode active material together with solution containing, for example, a conductive material and a binder to prepare mixture slurry.

As the conductive material, a conductive material used for the general lithium ion secondary batteries is available. Specifically, for example, carbon particles such as graphite powder, acetylene black, furnace black, thermal black, and channel black, and carbon fiber are available as the conductive material. The conductive material by the amount of, for example, around 3 mass % or more and 10 mass % or less with respect to the entire mass of the mixture is available.

As the binder, a binder used for the general lithium ion secondary batteries is available. Specifically, for example, polyvinylidene fluoride (PVDF), polytetrafluoroethylene, poly hexafluoropropylene, styrene-butadiene rubber, carboxymethyl cellulose, polyacrylonitrile, and modified polyacrylonitrile are available as the binder. The binder by the amount of, for example, around 2 mass % or more and 10 mass % or less with respect to the entire mass of the mixture is available. The mixing ratio of the negative electrode active material to the binder is desirable to be, for example, 95:5 by the weight ratio.

A solvent of the solution is selectable from, for example, N-methyl pyrrolidone, water, N,N-dimethylformamide, N,N-dimethylacetamide, methanol, ethanol, propanol, isopropanol, ethylene glycol, diethylene glycol, glycerin, dimethylsulfoxide, and tetrahydrofuran according to the kind of the binder.

The mixture coating step first applies the mixture slurry containing the positive electrode active material and the mixture slurry containing the negative electrode active material prepared at the mixture preparing step over the surfaces of the positive electrode current collector 111a and the negative electrode current collector 112a, respectively, by coating means such as a bar coater, a doctor blade, and a roll transfer machine. Next, the respective positive electrode current collector 111a and negative electrode current collector 112a over which the mixture slurries have been applied are heat-treated to volatile or vaporize the solvents in the solutions contained in the mixture slurries to remove the solvents. Thus, the positive electrode mixture layer 111b and the negative electrode mixture layer 112b are formed on the surfaces of the positive electrode current collector 111a and the negative electrode current collector 112a, respectively.

The molding step first performs compression molding on the respective positive electrode mixture layer 111b, which is formed on the surface of the positive electrode current collector 111a, and negative electrode mixture layer 112b, which is formed on the surface of the negative electrode current collector 112a, for example, using pressurizing means such as a roll press. This ensures configuring the positive electrode mixture layer 111b so as to have a thickness around, for example, 100 µm or more and 300 µm or less, and the negative electrode mixture layer 112b so as to have a thickness around, for example, 20 µm or more and 150 µm or less. Afterwards, the positive electrode current collector 111a and the positive electrode mixture layer 111b, and the negative electrode current collector 112a and the negative electrode mixture layer 112b are each cut out into the long strip shape, thus ensuring producing the positive electrode 111 and the negative electrode 112.

Here, as described above, in the case where the step of the water washing of the obtained lithium composite compound is provided after the finishing heat treatment step S23 in the production step of the positive electrode active material, compressibility of the positive electrode mixture layer 111b, which is formed on the surface of the positive electrode current collector 111a, can be improved. More specifically, water-washing and drying the lithium composite compound allows modifying the surface of the lithium composite compound and improving the compressibility of the positive electrode active material. This allows improving the density of the positive electrode mixture layer 111b and increasing electric energy accumulated per unit volume.

The following describes a water washing/drying step that performs the water washing and the drying of the lithium composite compound in more details.

The water washing/drying step immerses the lithium composite compound into pure water, removes the liquid by a solid-liquid separation, and dries the remaining solid material. These substances may be stirred when the lithium composite compound is immersed into the pure water. Adding the pure water such that the solid content percentage falls within the range of 33 mass % to 77 mass % is preferable for such water washing. The solid content percentage higher than 77 mass % makes the uniform water washing difficult. The solid content percentage lower than 33 mass % results in an excessive decreased amount of the lithium in the positive electrode active material, possibly deteriorating the property of the positive electrode active material. Since the effect appears in an extremely short period, the immersion period during which the lithium composite compound is immersed into the pure water is preferably within 20 minutes and more preferably within ten minutes. The immersion period in excess of 20 minutes decreases the lithium in the positive electrode active material, possibly deteriorating the property of the positive electrode active material.

As the solid-liquid separation, various kinds of methods such as a filtration under reduced pressure, a filtration under pressure, a filter press, a roller press, and a centrifuge are available. A moisture percentage of the lithium composite compound after the solid-liquid separation is preferably 20 mass % or less and 10 mass % or less is more preferable. The moisture percentage of the lithium composite compound in excess of 20 mass % increases an amount of reprecipitation of the lithium compound dissolved into the water content on the positive electrode active material and increases the water content remaining after the drying. This loses coatability when the positive electrode active material is applied over the positive electrode current collector and worsens the battery property, and therefore is not preferable. The moisture percentage of the lithium composite compound after the solid-liquid separation can be measured with, for example, an infrared moisture meter.

In the drying step of the lithium composite compound after the water washing, the atmosphere in the drying step is selectable from, for example, in the air in which partial pressures of the water vapor and carbon dioxide are lowered, in nitrogen, in oxygen, or in vacuum. The drying step is especially preferable to be performed in the vacuum. A drying temperature in the drying step is preferably 150° C. or more and 300° C. or less and more preferably 190° C. or more and 250° C. or less. The drying temperature in the drying step of lower than 150° C. makes it difficult to fully remove the water content, and the drying temperature higher than 300° C. makes a side reaction that worsens the property of the positive electrode active material remarkable.

The drying step preferably dividedly dries the lithium composite compound after the water washing twice or more. For example, before the temperature of the lithium composite compound after the water washing is increased to 150° C. or more, removing the most water content at a temperature around 60° C. to 100° C. is preferable. By removing the most water content at the low temperature, the side reaction in the subsequent drying at a high temperature is lowered, ensuring reducing a negative effect to the property of the lithium composite compound. The moisture percentage of the lithium composite compound after the drying is preferably 400 ppm or less, more preferably 300 ppm or less, and further preferably 250 ppm or less. The moisture percentage of the lithium composite compound after the drying can be measured by a Karl Fischer's method.

The positive electrode 111 and the negative electrode 112 produced as described above are opposed via the separator 113 and wound around the winding center axis to be the wound electrode group 110. In the wound electrode group 110, the negative electrode current collector 112a is coupled to the bottom portion of the battery can 101 via the negative electrode lead piece 104, the positive electrode current collector 111a is coupled to the battery lid 102 via the positive electrode lead piece 103, the insulating plate 105 or a similar member prevents the battery can 101 and the battery lid 102 from short-circuiting, and the wound electrode group 110 is housed in the battery can 101. Afterwards, the non-aqueous electrolyte is injected to the battery can 101, the battery lid 102 is fixed to the battery can 101 via the sealing material 106, and the battery can 101 is sealed, thus ensuring producing the non-aqueous secondary battery 100.

As the electrolyte injected to the battery can 101, the use of electrolyte produced by dissolving lithium hexafluorophosphate ($LiPF_6$), lithium tetrafluoroborate ($LiBF_4$), lithium perchlorate ($LiCLO_4$), or a similar substance as the electrolyte into a solvent such as diethyl carbonate (DEC), dimethyl carbonate (DMC), ethylene carbonate (EC), propylene carbonate (PC), vinylene carbonate (VC), methyl acetate (MA), ethyl methyl carbonate (EMC), and methyl propyl carbonate (MPC) is desirable. The electrolyte desirably has the concentration of 0.7 M or more and 1.5 M or less. A compound having a carboxylic acid anhydride group, a compound containing elemental sulfur such as propanesultone, and a compound containing boron may be mixed with these electrolytes. The objects to add these compounds are to reduce reductive decomposition of the electrolyte on the surface of the negative electrode, prevent reduction precipitation at the negative electrode of the metallic element such as manganese eluted from the positive electrode, improve an ion conductive property of the electrolyte, provide incombustibility of the electrolyte, and a similar object; therefore, the compound only needs to be appropriately selected according to the object.

The non-aqueous secondary battery 100 having the above-described configuration includes the battery lid 102 as a positive electrode external terminal and the bottom portion of the battery can 101 as a negative electrode external terminal. The non-aqueous secondary battery 100 can accumulate electric power supplied from the outside at the wound electrode group 110 and the electric power accumulated to the wound electrode group 110 can be supplied to an external device or a similar device. Thus, the non-aqueous secondary battery 100 of this embodiment is, for example, available as a small power supply for, for example, a mobile electronic device and household electrical equipment, a stationary power supply for, for example, an uninterruptible power supply and a power leveling device, and a driving power supply for, for example, a ship, a railway, a hybrid vehicle, and an electric vehicle.

The following describes Working Examples based on the method for producing the positive electrode active material, the positive electrode active material, and the lithium ion secondary battery of the present invention and Comparative Examples different from the method for producing the positive electrode active material, the positive electrode active material, and the lithium ion secondary battery of the present invention.

Working Example 1

(Mixing Step)

First, lithium carbonate, nickel hydroxide, cobalt carbonate, and manganese carbonate were prepared as the starting materials of the positive electrode active material. Next, the respective starting materials were weighted so as to meet: Li:Ni:Co:Mn=1.04:0.80:0.10:0.10 by an atom ratio, pulverized by a pulverizer, and a wet blending was performed to prepare slurry.

(Firing Step: First Precursor Forming Step, Second Precursor Forming Step)

Next, the slurry (mixture) obtained at the mixing step was dried by a spray dryer, and the dried mixture was fired to obtain fired powder. Specifically, the mixture of 300 g produced by drying the slurry obtained at the mixing step was filled in an alumina container with 300 mm in length, 300 mm in width, and 100 mm in height. A heat treatment was performed on the mixture under an air atmosphere at a heat treatment temperature of 350° C. for one hour in a continuous conveyance furnace (a first precursor forming step). Next, a heat treatment was performed on the powder (the first precursor) obtained in the first precursor forming step in an oxygen air current at the heat treatment temperature of 575° C. for ten hours in the continuous conveyance furnace whose atmosphere was replaced by an atmosphere with an oxygen concentration in the furnace of 99% or more (a second precursor forming step).

(Measurement of Amount of Reacted Lithium Carbonate in Second Precursor)

The amount of reacted lithium carbonate in the powder (the second precursor) obtained in the second precursor forming step was analyzed by a neutralization titration as follows. First, the second precursor of 0.2 g was dispersed into pure water of 30 ml bubbled with argon gas, and the pure water was stirred for 60 minutes. Afterwards, the pure water into which the second precursor had been dispersed was suctioned and filtered to obtain filtrate. The obtained filtrate was titrated with hydrochloric acid.

The titration curve goes through two stages, a curve up to a first equivalence point indicates a total amount of hydroxide ion in lithium hydroxide and carbonate ion in lithium carbonate, and a curve from the first equivalence point to a second equivalence point indicates an amount of carbonic acid hydrogen ion generated from the carbonate ion. Therefore, the amount of lithium carbonate was calculated from a titer from the first equivalence point to the second equivalence point. The amount of the lithium hydroxide was calculated from a difference between the titer up to the first equivalence point and the titer from the first equivalence point to the second equivalence point. Based on the calculated amount of lithium carbonate, the amount of reacted lithium carbonate in the second precursor was obtained by the following Formula (3).

$$\{(Q_0-Q_2)/Q_2\} \times 100 = Q_R \quad (3)$$

In the above-described Formula (3), $Q_0$ indicates the amount of lithium carbonate in the starting material, $Q_2$ indicates the amount of lithium carbonate in the second precursor, and $Q_R$ indicates the amount of reacted lithium carbonate in the second precursor. Here, the amount of lithium carbonate $Q_0$ in the starting material can be calculated, for example, from the mixing ratio of the starting material.

(Firing Step: Finishing Heat Treatment Step)

Next, the heat treatment was performed on the second precursor obtained in the second precursor forming step in oxidation air current at the heat treatment temperature of 865° C. for ten hours in the continuous conveyance furnace whose atmosphere was replaced by the atmosphere with an oxygen concentration in the furnace of 99% or more to obtain fired powder (a lithium composite compound). The obtained fired powder was classified by openings of 53 µm or less to produce positive electrode active materials. This Working Example did not perform the water washing on the obtained lithium composite compound after the finishing heat treatment step.

(Measurements of Amount of Remaining Lithium Hydroxide and Amount of Remaining Lithium Carbonate in Positive Electrode Active Material)

The amount of remaining lithium hydroxide and the amount of remaining lithium carbonate on the positive electrode active material of Working Example 1 obtained by the above-described steps were analyzed by the neutralization titration as follows. First, similarly to the measurement of the amount of reacted lithium carbonate in the second precursor, the positive electrode active material of 0.5 g was dispersed into pure water of 30 ml bubbled with argon gas, and the pure water was stirred for 60 minutes. Afterwards, the pure water into which the positive electrode active material had been dispersed and stirred was suctioned and filtered to obtain filtrate. The obtained filtrate was titrated with hydrochloric acid. Similarly to the amount of lithium hydroxide and the amount of lithium carbonate in the second precursor, the amount of remaining lithium hydroxide and the amount of remaining lithium carbonate on the positive electrode active material were calculated by a titration of the filtrate produced by immersing the positive electrode active material into the pure water and stirring the pure water for 60 minutes.

(Measurement of Amount of Dissolution of Lithium Hydroxide in Positive Electrode Active Material)

The amount of dissolution of the lithium hydroxide in the positive electrode active material was measured by the following procedure. First, the positive electrode active material with the solid content percentage of 1.6 mass % was immersed and stirred into pure water for 30 minutes, and then an amount of lithium hydroxide A was detected by a neutralization titration of the filtrate. The identical positive electrode active material with the solid content percentage of 1.6 mass % was immersed and stirred into pure water for 120 minutes, and then an amount of lithium hydroxide B was detected by the neutralization titration of the filtrate. Then, an amount of dissolution (B−A), which is a difference between the amount of lithium hydroxide A and the amount of lithium hydroxide B, was obtained. The dissolution speed can be obtained by dividing the amount of dissolution by the immersion period.

(Measurements of Lattice Constant and Crystallite Diameter of Positive Electrode Active Material)

The crystallite diameter of the positive electrode active material was measured by the following procedure. First, the crystalline structure of the positive electrode active material was measured by X-ray diffraction (XRD) to obtain the lattice constant of the positive electrode active material. The XRD measurement was performed by a concentration method using an XRD measurement device manufactured by Rigaku Corporation, RINT-2000. The CuKα line was used for the X-ray, and the output was set to 48 kV and 28 mA.

With the measuring conditions, a step width was set to 0.02°, the measurement period per step was set to one second, and the measurement result was smoothened by a Savitzky-Golay method. Afterwards, the background and the Kα$_2$ line were removed to obtain a (003) peak at the time and a half-value width $\beta_{exp}$ of (104). Furthermore, a half-value width $\beta_i$ when a standard Si sample (NIST Standard Material 640d) was measured in the identical device and under the identical conditions was obtained, and the half-value width β was defined by the following Formula (4).

[Expression 1]

$$\beta = \sqrt{\beta_{exp}^2 - \beta_i^2} \quad (4)$$

Using this half-value width β, the crystallite diameter was obtained using the Scherrer formula expressed by the following Formula (5).

[Expression 2]

$$D = \frac{K\lambda}{\beta \cos\theta} \quad (5)$$

In the above-described Formula (5), λ, indicates the wavelength of the X-ray, θ indicates the reflection angle, and K indicates the Scherrer constant, and K=0.9 was met. Then, an average value of the crystallite diameters at the (003) peak and the (104) peak was set as the crystallite diameter of the positive electrode active material of Working Example 1.

(Composition of Positive Electrode Active Material and Measurement of Specific Surface Area)

Furthermore, the composition of the positive electrode active material was analyzed by ICP using an ICP emission spectrophotometer manufactured by PerkinElmer Inc., OPTIMA8300. As the pretreatment, the positive electrode active material was dissolved into aqua regia, and quantitative analysis was performed on the dissolved solution by the ICP. Furthermore, the measurement was performed using an automatic specific surface area measuring apparatus BEL-CAT manufactured by BEL JAPAN, INC., and the specific surface area of the positive electrode active material was calculated by the BET method.

(Evaluation for Compressibility of Positive Electrode Active Material)

The compressibility of the positive electrode active material was evaluated by measurement with the autograph AGS-X manufactured by Shimadzu Corporation. Positive electrode active material powder of 0.5 g was filled in a mold with φ10 mm, and the mold was installed to the autograph. The positive electrode active material was measured at a crosshead speed of a speed of 1.0 mm/min and up to a test force of 4000 N to obtain a compression curve of the powder from the test force at the time, the amount of stroke, the cross-sectional area of the mold, and the weight of the positive electrode active material. The compressibility was evaluated from the molding density at the press pressure of 5 MPa in this compression curve.

Working Example 2

Except that the heat treatment temperature in the second precursor forming step was set to 600° C. and the heat treatment temperature in the finishing heat treatment step was set to 842° C., a positive electrode active material of Working Example 2 was produced similarly to the positive electrode active material of Working Example 1, and the measurements were performed similar to those of the positive electrode active material of Working Example 1.

From Working Example 3 to Working Example 6

Except that the heat treatment temperature in the finishing heat treatment step was set to 850° C. for Working Example 3, 865° C. for Working Example 4, 880° C. for Working Example 5, and 895° C. for Working Example 6 in the production steps of the positive electrode active materials, the positive electrode active materials of Working Example 3 to Working Example 6 were produced similarly to the positive electrode active material of Working Example 2, and the measurements were performed similar to those of the positive electrode active material of Working Example 1. Additionally, when measured using a microcompression testing machine (MCT-510 manufactured by Shimadzu Corporation), the particle fracture strength was 66 MPa in Working Example 3, 61 MPa in Working Example 4, 58 MPa in Working Example 5, and 57 MPa in Working Example 6. The particle fracture strength with the microcompression testing machine was measured by sparging the positive electrode active material on a pressure plate by a minute amount and compressing the positive electrode active material in units of one particle at the test force of 49 mN and the load rate of 0.4747 mN/sec.

Working Example 7

In the mixing step, the respective starting materials were weighted so as to meet Li:Ni:Co:Mn=1.04:0.80:0.125:0.075 by the atom ratio. In the firing step, the heat treatment temperature in the second precursor forming step was set to 600° C. and the heat treatment temperature in the finishing heat treatment step was set to 850° C. Except that, a positive electrode active material of Working Example 7 was produced similarly to the positive electrode active material of Working Example 1 and the measurements were performed similar to those of the positive electrode active material of Working Example 1.

Working Example 8

In the mixing step, the respective starting materials were weighted so as to meet Li:Ni:Co:Mn=1.08:0.80:0.05:0.15 by the atom ratio. In the firing step, the heat treatment temperature in the second precursor forming step was set to 600° C. and the heat treatment temperature in the finishing heat treatment step was set to 865° C. Except that, a positive electrode active material of Working Example 8 was produced similarly to the positive electrode active material of Working Example 1 and the measurements were performed similar to those of the positive electrode active material of Working Example 1.

Working Example 9

In the mixing step, the respective starting materials were weighted so as to meet Li:Ni:Co:Mn=1.04:0.80:0.15:0.05 by the atom ratio. In the firing step, the heat treatment temperature in the finishing heat treatment step was set to 755° C. Except that, a positive electrode active material of Working Example 9 was produced similarly to the positive electrode active material of Working Example 2 and the measurements were performed similar to those of the positive electrode active material of Working Example 1.

Working Example 10

Except that the heat treatment temperature in the finishing heat treatment step was set to 770° C., a positive electrode active material of Working Example 10 was produced similarly to the positive electrode active material of Working Example 9 and the measurements were performed similar to those of the positive electrode active material of Working Example 1.

From Working Example 11 to Working Example 13

In the mixing step, the respective starting materials were weighted so as to meet Li:Ni:Co:Mn=1.08:0.80:0.15:0.05 by the atom ratio. In the firing step, the heat treatment temperature in the second precursor forming step was set to 690° C. Except that the heat treatment temperature in the finishing heat treatment step was set to 820° C. for Working Example 11, 850° C. for Working Example 12, and 880° C. for Working Example 13, positive electrode active materials of Working Example 11 to Working Example 13 were produced similarly to the positive electrode active material of Working Example 1, and the measurements were performed similar to those of the positive electrode active material of Working Example 1. Additionally, when measured using the microcompression testing machine (MCT-510 manufactured by Shimadzu Corporation), the particle fracture strength was 71 MPa in Working Example 9, 132 MPa in Working Example 10, and 125 MPa in Working Example 11.

Working Example 14 and Working Example 15

Working Example 14 and Working Example 15 were obtained by performing the water washing and the drying processes on the positive electrode active materials obtained in Working Example 13 and Working Example 5, respectively. The water washing and the drying processes were performed by the following procedure. The positive electrode active materials were water-washed by being immersed in pure water with the solid content percentage of 43 mass % and stirred at room temperature for 20 minutes. The positive electrode active materials were filtered and then were dried in vacuum at 190° C. for ten hours.

Working Example 16

A positive electrode active material of Working Example 16 was obtained by performing the water washing and the drying processes on the positive electrode active material obtained in Working Example 13. The water washing and the drying processes of the positive electrode active material were performed by the following procedure. First, the positive electrode active material obtained in Working Example 13 was immersed into pure water with the solid content percentage of 66 mass % at room temperature for ten seconds and was water-washed. Next, the positive electrode active material that had been immersed into the pure water and on which the water washing had been completed was depressurized and filtered. Afterwards, the drying was performed in vacuum in two stages: drying at the drying temperature of 80° C. for 14 hours and further drying at the drying temperature of 190° C. for 14 hours.

Working Example 17

Except that the drying temperature at the second stage was set to 240° C. in Working Example 16, a positive electrode active material of Working Example 17 was manufactured similarly to the positive electrode active material of Working Example 16.

Working Example 18

Except that the drying at the first stage in Working Example 17 was not performed and only the drying at the second stage was performed, a positive electrode active material of Working Example 18 was manufactured similarly to the positive electrode active material of Working Example 17.

Comparative Example 1

In the mixing step, the respective starting materials were weighted so as to meet Li:Ni:Co:Mn=1.04:0.80:0.15:0.05 by the atom ratio. In the firing step, the heat treatment temperature in the second precursor forming step was set to 550° C. and the heat treatment temperature in the finishing heat treatment step was set to 755° C. Except that, a positive electrode active material of Comparative Example 1 was produced similarly to the positive electrode active material of Working Example 9 and the measurements were performed similar to those of the positive electrode active material of Working Example 1.

Comparative Example 2

Except that the heat treatment temperature in the second precursor forming step was set to 575° C. and the heat treatment temperature in the finishing heat treatment step was set to 755° C., a positive electrode active material of Comparative Example 2 was produced similarly to the positive electrode active material of Comparative Example 1, and the measurements were performed similar to those of the positive electrode active material of Working Example 1.

Comparative Example 3

Except that the heat treatment temperature in the finishing heat treatment step was set to 906° C., a positive electrode active material of Comparative Example 3 was produced similarly to the positive electrode active material of Working Example 2 and the measurements were performed similar to those of the positive electrode active material of Working Example 1.

The following Table 1 shows the composition formulae of the positive electrode active materials, the heat treatment temperatures in the second precursor forming step, the heat treatment temperatures in the finishing heat treatment step, and presences/absences of the water washing-drying steps from Working Example 1 to Working Example 18 and from Comparative Example 1 to Comparative Example 3. As the results from the XRD measurement, a diffraction pattern corresponding to an α-NaFeO$_2$ type layered structure was obtained from Working Example 1 to Working Example 18 and from Comparative Example 1 to Comparative Example 3.

TABLE 1

| | Composition formula of positive electrode active material | Heat treatment temperature in second precursor forming step [C. °] | Heat treatment temperature in finishing heat treatment step [C. °] | Water washing and drying steps |
|---|---|---|---|---|
| Working Example 1 | Li$_{1.01}$Ni$_{0.80}$Co$_{0.10}$Mn$_{0.10}$O$_2$ | 575 | 865 | Absent |
| Working Example 2 | Li$_{1.01}$Ni$_{0.80}$Co$_{0.10}$Mn$_{0.10}$O$_2$ | 600 | 842 | Absent |
| Working Example 3 | Li$_{1.01}$Ni$_{0.80}$Co$_{0.10}$Mn$_{0.10}$O$_2$ | 600 | 850 | Absent |
| Working Example 4 | Li$_{1.01}$Ni$_{0.80}$Co$_{0.10}$Mn$_{0.10}$O$_2$ | 600 | 865 | Absent |
| Working Example 5 | Li$_{1.01}$Ni$_{0.80}$Co$_{0.10}$Mn$_{0.10}$O$_2$ | 600 | 880 | Absent |
| Working Example 6 | Li$_{1.01}$Ni$_{0.80}$Co$_{0.10}$Mn$_{0.10}$O$_2$ | 600 | 895 | Absent |
| Working Example 7 | Li$_{1.01}$Ni$_{0.80}$Co$_{0.125}$Mn$_{0.075}$O$_2$ | 600 | 850 | Absent |
| Working Example 8 | Li$_{1.05}$Ni$_{0.80}$Co$_{0.05}$Mn$_{0.15}$O$_2$ | 600 | 865 | Absent |
| Working Example 9 | Li$_{1.00}$Ni$_{0.80}$Co$_{0.15}$Mn$_{0.05}$O$_2$ | 600 | 755 | Absent |
| Working Example 10 | Li$_{1.05}$Ni$_{0.80}$Co$_{0.15}$Mn$_{0.05}$O$_2$ | 600 | 770 | Absent |
| Working Example 11 | Li$_{1.00}$Ni$_{0.80}$Co$_{0.15}$Mn$_{0.05}$O$_2$ | 690 | 820 | Absent |
| Working Example 12 | Li$_{1.00}$Ni$_{0.80}$Co$_{0.15}$Mn$_{0.05}$O$_2$ | 690 | 850 | Absent |
| Working Example 13 | Li$_{1.00}$Ni$_{0.80}$Co$_{0.15}$Mn$_{0.05}$O$_2$ | 690 | 880 | Absent |
| Working Example 14 | Li$_{1.01}$Ni$_{0.80}$Co$_{0.15}$Mn$_{0.05}$O$_2$ | 690 | 880 | Present |
| Working Example 15 | Li$_{1.01}$Ni$_{0.80}$Co$_{0.10}$Mn$_{0.10}$O$_2$ | 600 | 880 | Present |
| Working Example 16 | Li$_{1.00}$Ni$_{0.80}$Co$_{0.15}$Mn$_{0.05}$O$_2$ | 690 | 880 | Present |
| Working Example 17 | Li$_{1.00}$Ni$_{0.80}$Co$_{0.15}$Mn$_{0.05}$O$_2$ | 690 | 880 | Present |
| Working Example 18 | Li$_{1.00}$Ni$_{0.80}$Co$_{0.15}$Mn$_{0.05}$O$_2$ | 690 | 880 | Present |
| Comparative Example 1 | Li$_{1.01}$Ni$_{0.80}$Co$_{0.15}$Mn$_{0.05}$O$_2$ | 550 | 755 | Absent |
| Comparative Example 2 | Li$_{1.01}$Ni$_{0.80}$Co$_{0.15}$Mn$_{0.05}$O$_2$ | 575 | 755 | Absent |
| Comparative Example 3 | Li$_{1.00}$Ni$_{0.80}$Co$_{0.10}$Mn$_{0.10}$O$_2$ | 600 | 906 | Absent |

The following Table 2 shows the amounts of reacted lithium carbonate in the second precursor forming step in the production step of the positive electrode active materials, the amounts of dissolution of the lithium hydroxide in the positive electrode active materials, and the specific surface areas from Working Example 1 to Working Example 18 and from Comparative Example 1 to Comparative Example 3. The following Table 3 shows the amounts of remaining lithium hydroxide and the amounts of remaining lithium carbonate on the positive electrode active materials from Working Example 1 to Working Example 18 and from Comparative Example 1 to Comparative Example 3.

TABLE 2

| | Amount of reacted lithium carbonate in second precursor forming step [mass %] | Amount of elution of lithium hydroxide in positive electrode active material [mass %] | Specific surface area [m$^2$/g] |
|---|---|---|---|
| Working Example 1 | 94 | 0.10 | 0.38 |
| Working Example 2 | 97.4 | 0.14 | 0.78 |
| Working Example 3 | 97.4 | 0.16 | 0.54 |
| Working Example 4 | 97.4 | 0.09 | 0.32 |
| Working Example 5 | 97.4 | 0.07 | 0.24 |

TABLE 2-continued

|  | Amount of reacted lithium carbonate in second precursor forming step [mass %] | Amount of elution of lithium hydroxide in positive electrode active material [mass %] | Specific surface area [m²/g] |
|---|---|---|---|
| Working Example 6 | 97.4 | 0.06 | 0.17 |
| Working Example 7 | 97.5 | 0.31 | 0.80 |
| Working Example 8 | 97.2 | 0.17 | 0.51 |
| Working Example 9 | 92.5 | 0.44 | 1.19 |
| Working Example 10 | 92.5 | 0.33 | 0.94 |
| Working Example 11 | 99.2 | 0.13 | 1.50 |
| Working Example 12 | 99.2 | 0.08 | 0.47 |
| Working Example 13 | 99.2 | 0.07 | 0.25 |
| Working Example 14 | 99.2 | 0.07 | 0.65 |
| Working Example 15 | 97.4 | 0.07 | 0.64 |
| Working Example 16 | 99.2 | 0.07 | 0.53 |
| Working Example 17 | 99.2 | 0.07 | 0.46 |
| Working Example 18 | 99.2 | 0.07 | 0.47 |
| Comparative Example 1 | 91.5 | 0.45 | 0.91 |
| Comparative Example 2 | 91.9 | 0.43 | 0.99 |
| Comparative Example 3 | 97.4 | 0.10 | 0.09 |

TABLE 3

|  | Amount of remaining lithium hydroxide on positive electrode active material (mass %) | Amount of remaining lithium carbonate on positive electrode active material (mass %) | Moisture percentage (ppm) |
|---|---|---|---|
| Working Example 1 | 0.40 | 0.13 |  |
| Working Example 2 | 0.66 | 0.18 |  |
| Working Example 3 | 0.48 | 0.15 |  |
| Working Example 4 | 0.36 | 0.12 |  |
| Working Example 5 | 0.28 | 0.11 |  |
| Working Example 6 | 0.17 | 0.10 |  |
| Working Example 7 | 1.14 | 0.35 |  |
| Working Example 8 | 0.52 | 0.15 |  |
| Working Example 9 | 0.80 | 0.22 |  |
| Working Example 10 | 0.72 | 0.22 |  |
| Working Example 11 | 0.59 | 0.27 |  |
| Working Example 12 | 0.46 | 0.21 |  |
| Working Example 13 | 0.27 | 0.18 | 200 |
| Working Example 14 | 0.03 | 0.08 | 230 |
| Working Example 15 | 0.04 | 0.09 | 240 |
| Working Example 16 | 0.08 | 0.06 | 250 |
| Working Example 17 | 0.03 | 0.06 | 190 |
| Working Example 18 | 0.04 | 0.07 | 200 |
| Comparative Example 1 | 0.83 | 0.27 |  |
| Comparative Example 2 | 0.82 | 0.25 |  |
| Comparative Example 3 | 0.25 | 0.11 |  |

As shown in Table 2, in the positive electrode active material of Working Example 1, the amount of reacted lithium carbonate in the second precursor forming step was about 94 mass %. In the positive electrode active materials from Working Example 2 to Working Example 6, the amounts of reacted lithium carbonate in the second precursor forming step were about 97.4 mass %. In the positive electrode active material of Working Example 7, the amount of reacted lithium carbonate in the second precursor forming step was about 97.5 mass %. In the positive electrode active material of Working Example 8, the amount of reacted lithium carbonate in the second precursor forming step was about 97.2 mass %. In the positive electrode active materials of Working Example 9 and Working Example 10, the amounts of reacted lithium carbonate in the second precursor forming step were about 92.5 mass %. In the positive electrode active materials from Working Example 11 to Working Example 14 and Working Example 16 to Working Example 18, the amounts of reacted lithium carbonate in the second precursor forming step were about 99.2 mass %. In the positive electrode active material of Working Example 15, the amount of reacted lithium carbonate in the second precursor forming step was about 97.4 mass %.

Table 2 shows that the smaller the amount of dissolution of the lithium hydroxide in the positive electrode active material is, the higher the amount of reacted lithium carbonate in the positive electrode active material is and the higher the crystal stability is. Table 3 shows that the smaller the amount of remaining lithium carbonate is, the higher the amount of reacted lithium carbonate in the positive electrode active material is and the higher the crystal stability is. The amounts of dissolution of the lithium hydroxide in the positive electrode active materials from Working Example 1 to Working Example 8 and from Working Example 10 to Working Example 18 shown in Table 2 were all low values of 0.33 mass % or less, the amounts of reacted lithium carbonate in the positive electrode active materials were high, and the crystal stability was high.

As shown in Table 2, the amounts of dissolution of the lithium hydroxide in the positive electrode active materials from Working Example 14 to Working Example 18 on which the water washing had been performed exhibited the low values of 0.07 mass %. Furthermore, as shown in Table 3, the amounts of remaining lithium carbonate in the positive electrode active materials from Working Example 14 to Working Example 18 on which the water washing had been performed exhibited the low values of 0.09 or less. Accordingly, it has been found that performing the water washing ensures reducing the amount of remaining lithium carbonate in the positive electrode active material, reducing the amount of carbonic acid gas generated by lithium carbonate degradation caused by the charge/discharge cycles, and improving the charge/discharge cycle characteristics.

Among the positive electrode active materials from Working Example 14 to Working Example 18 on which the water washing was performed, the positive electrode active material of Working Example 17 on which the drying was performed in two stages was able to reduce the moisture amount to be the least, 190 ppm. Although the drying at the first stage was not performed on the positive electrode active material of Working Example 18, the moisture amount was able to be reduced to 200 ppm. Accordingly, it has been found that, although the drying needs not to be performed in two stages, the drying at a high temperature of 240° C. for 14 hours is effective in that the moisture amount decreases.

In contrast, the positive electrode active materials of Comparative Example 1 and Comparative Example 2 exhibited the amounts of reacted lithium carbonate in the second precursor forming step of about 91.5 mass % and about 91.9 mass %, respectively. Additionally, both of Comparative Example 1 and Comparative Example 2 exhibited the amounts of dissolution of the lithium hydroxide in the positive electrode active materials shown in Table 2 higher than 0.33 mass %. Since the heat treatment temperature was low in the second precursor forming step and also the heat treatment temperature was low in the finishing heat treatment step, the amounts of reacted lithium carbonate lowered in these Comparative Examples.

The amount of reacted lithium carbonate of Comparative Example 3 was 97.4 mass %. Although this Comparative Example had the high heat treatment temperature in the finishing heat treatment step and therefore satisfied the amount of reacted lithium carbonate, the heat treatment temperature in the finishing heat treatment step was high and the decrease in the specific surface area decreased a reaction area with Li. Consequently, as described later, the resistance increase rates of the lithium ion secondary batteries that used the positive electrode active materials from Comparative Example 1 to Comparative Example 3 became high and therefore they became unmeasurable. Additionally, the discharge capacities of the lithium ion secondary batteries using the positive electrode active materials from Comparative Example 1 to Comparative Example 3 were all low.

The following Table 4 shows crystallite diameters of the positive electrode active materials, lattice constants of an a-axis, and lattice constants of a c-axis from Working Example 1 to Working Example 18 and from Comparative Example 1 to Comparative Example 3.

TABLE 4

|  | Crystallite diameter [nm] | Lattice constant of a-axis [Å] | Lattice constant of c-axis [Å] |
| --- | --- | --- | --- |
| Working Example 1 | 135 | 2.87 | 14.22 |
| Working Example 2 | 138 | 2.87 | 14.21 |
| Working Example 3 | 124 | 2.87 | 14.22 |
| Working Example 4 | 142 | 2.87 | 14.22 |
| Working Example 5 | 177 | 2.87 | 14.22 |

TABLE 4-continued

|  | Crystallite diameter [nm] | Lattice constant of a-axis [Å] | Lattice constant of c-axis [Å] |
| --- | --- | --- | --- |
| Working Example 6 | 128 | 2.87 | 14.22 |
| Working Example 7 | 144 | 2.87 | 14.20 |
| Working Example 8 | 118 | 2.88 | 14.23 |
| Working Example 9 | 69 | 2.87 | 14.17 |
| Working Example 10 | 79 | 2.87 | 14.20 |
| Working Example 11 | 112 | 2.87 | 14.19 |
| Working Example 12 | 104 | 2.87 | 14.21 |
| Working Example 13 | 115 | 2.87 | 14.21 |
| Working Example 14 | 115 | 2.87 | 14.21 |
| Working Example 15 | 177 | 2.87 | 14.22 |
| Working Example 16 | 115 | 2.87 | 14.21 |
| Working Example 17 | 115 | 2.87 | 14.21 |
| Working Example 18 | 115 | 2.87 | 14.21 |
| Comparative Example 1 | 79 | 2.87 | 14.21 |
| Comparative Example 2 | 74 | 2.87 | 14.22 |
| Comparative Example 3 | — | 2.88 | 14.21 |

In Table 4, the crystallite diameter indicates the degree of the grain growth in the positive electrode active material. As long as the ratio (1-x-y-z) of Mn in the composition of the positive electrode active material indicated by the above-described Formula (1) is larger than 0, or more preferably $0.05 \leq (1-x-y-z) \leq 0.18$ is met, the charge and discharge are possible even when the crystal grains in the positive electrode active material grow. The lattice constant indicates that the positive electrode active material is correctly produced.

(Evaluation for Compressibility of Positive Electrode Active Material)

Using the autograph, the molding densities at the press pressure of 5 MPa were measured as the compressibility of the powder of the positive electrode active materials of Working Examples 5, 9, 13, 14, and 15. The results were that the positive electrode active material of Working Example 5 was 2.3 g/cm$^3$, the positive electrode active material of Working Example 9 was 1.7 g/cm$^3$, the positive electrode active material of Working Example 13 was 2.3 g/cm$^3$, the positive electrode active material of Working Example 14 was 2.6 g/cm$^3$, and the positive electrode active material of Working Example 15 was 2.6 g/cm$^3$. The following Table 5 shows the results of evaluation for compressibility of the positive electrode active materials of Working Examples 5, 9, 13, 14, and 15.

TABLE 5

|  | Molding density at press pressure of 5 MPa (g/cm$^3$) |
| --- | --- |
| Working Example 5 | 2.3 |
| Working Example 9 | 1.7 |
| Working Example 13 | 2.3 |
| Working Example 14 | 2.6 |
| Working Example 15 | 2.6 |

With the positive electrode active materials of Working Examples 5 and 14 on which the heat treatment was performed at the high temperature in the finishing heat treatment step, the grain growth was promoted, unevennesses on the secondary particle surfaces decreased, and a friction between the secondary particles was lowered; therefore, the compressibility was satisfactory. Further, in the positive electrode active materials of Working Examples 14 and 15 on which the water washing and the drying steps were performed, further improvement in compressibility was observed. It is inferred that this occurs because the surfaces were modified through the water washing. When the molding density at the press pressure of 5 MPa is 2.5 g/cm³ or more, a density of a positive electrode mixture layer can be improved, and an effect to increase the accumulated electric energy per unit volume can be sufficiently obtained.

Figure 3:
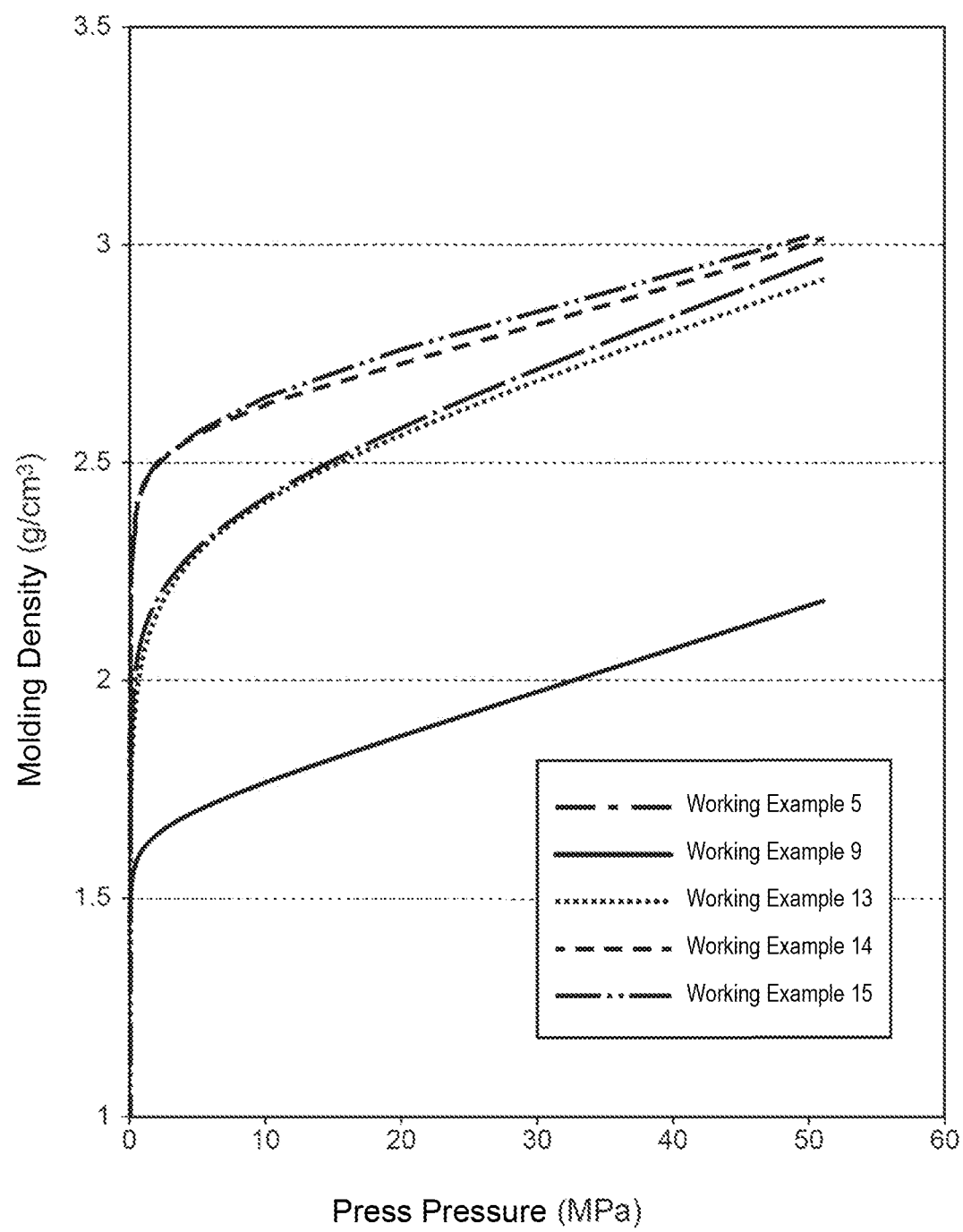
FIG. 3 is a graph illustrating compression properties of positive electrode active materials according to working examples of the present invention.

FIG. 3 is a graph illustrating a relationship between the press pressure and the molding density of the positive electrode active materials of Working Examples 5, 9, 13, 14, and 15 taking the press pressure [MPa] on the horizontal axis and the molding density [g/cm³] on the vertical axis. In the positive electrode active materials of all the embodiments, an approximately rectilinear proportional relationship was observed between the press pressure and the molding density at the press pressure of 5 MPa or more; therefore, the compressibility was satisfactory.

(Manufacturing Lithium Ion Secondary Batteries)

Using the positive electrode active materials from Working Example 1 to Working Example 18 and from Comparative Example 1 to Comparative Example 3, the respective lithium ion secondary batteries from Working Example 1 to Working Example 18 and from Comparative Example 1 to Comparative Example 3 were manufactured by the following procedure.

First, the positive electrode active material, a binder, and a conductive material were mixed to prepare positive electrode mixture slurry. Then, the prepared positive electrode mixture slurry was applied over an aluminum foil as a positive electrode current collector with a thickness of 20 and the positive electrode mixture slurry was dried at 120° C. After that, a compression molding was performed with a press such that the electrode density became 2.6 g/cm³, and this product was punched into a disk shape with a diameter of 15 mm to manufacture positive electrodes. Additionally, negative electrodes were manufactured using metallic lithium or lithium titanate (LTO) as negative electrode active materials.

Next, lithium ion secondary batteries were manufactured using the manufactured positive electrodes, negative electrodes, and non-aqueous electrolytes. As the non-aqueous electrolytes, solution produced by dissolving LiPF$_6$ so as to be the concentration of 1.0 mol/L into a solvent in which ethylene carbonate and dimethyl carbonate were mixed such that the volume ratio became 3:7 was used.

Next, the metallic lithium was used as the negative electrode active materials for the respective lithium ion secondary batteries from Working Example 1 to Working Example 18 and from Comparative Example 1 to Comparative Example 3, a charge/discharge test was conducted, and the first discharge capacity was measured. With a charging current of 0.2 CA, the charge was performed at a constant current and a constant voltage up to a charge cutoff voltage of 4.3 V. With a discharge current of 0.2 CA, the discharge was performed at a constant current up to a discharge cutoff voltage of 3.3 V. The following Table 6 shows the measurement results of the discharge capacities of the lithium ion secondary batteries from Working Example 1 to Working Example 13 and from Comparative Example 1 to Comparative Example 3.

The charge/discharge test was conducted on the respective lithium ion secondary batteries from Working Example 1 to Working Example 18 and from Comparative Example 1 to Comparative Example 3 using lithium titanate (LTO) as the negative electrode active materials. With a charging current of 0.2 CA, the charge was performed at a constant current and a constant voltage up to a charge cutoff voltage of 2.75 V. With a discharge current of 0.2 CA, the discharge was performed by the charge and discharge by two cycles at a constant current up to a discharge cutoff voltage of 1.7 V. Afterwards, an initial DC resistance value was measured at a State of Charge (SOC) of 50%. Furthermore, the charge and discharge were repeated by 100 cycles with the charge and discharge currents of 3.0 CA, the charge cutoff voltage of 2.85 V, and the discharge cutoff voltage of 1.7 V. After 100 cycles, a DC resistance value with an electric potential at which the initial DC resistance value was measured was measured. A percentage of a value found by dividing the DC resistance value measured at the 100th cycle by the initial DC resistance value was calculated and defined as the resistance increase rate.

The following Table 6 shows the measurement results of the resistance increase rate of the lithium ion secondary batteries from Working Example 1 to Working Example 13 and from Comparative Example 1 to Comparative Example 3.

TABLE 6

|  | Discharge capacity [Ah/kg] | Resistance increase rate [%] |
|---|---|---|
| Working Example 1 | 196 | 30 |
| Working Example 2 | 197 | 27 |
| Working Example 3 | 195 | 27 |
| Working Example 4 | 195 | 26 |
| Working Example 5 | 193 | 23 |
| Working Example 6 | 191 | 22 |
| Working Example 7 | 189 | 30 |
| Working Example 8 | 192 | 27 |
| Working Example 9 | 200 | 35 |
| Working Example 10 | 195 | 33 |
| Working Example 11 | 198 | 24 |
| Working Example 12 | 197 | 29 |
| Working Example 13 | 192 | 27 |
| Comparative Example 1 | 178 | 47 |
| Comparative Example 2 | 182 | 41 |
| Comparative Example 3 | 168 | — |

As described above, the positive electrode active materials from Working Example 1 to Working Example 13 are produced through the above-described mixing step and firing step, that is, the first precursor forming step, the second precursor forming step, and the finishing heat treatment step. The second precursor forming step reacts 92 mass % or more of the lithium carbonate in the first precursor to obtain the second precursor. With the lithium ion secondary batteries from Working Example 1 to Working Example 13 that used the thus produced positive electrode active materials from Working Example 1 to Working Example 13 as the positive electrodes, the discharge capacity was 189 Ah/kg or more and the resistance increase rate was 35% or less; therefore, all Working Example 1 to Working Example 13 obtained the satisfactory results. With the lithium ion secondary batteries from Working Example 14 to Working Example 18 that used the positive electrode active materials from Working Example 14 to Working Example 18 on which the water washing was performed as the positive electrodes as well, the discharge capacity was 185 Ah/kg or more and the resistance increase rate was 35% or less; therefore, all Working Example 14 to Working Example 18 obtained the satisfactory results.

In contrast, the lithium ion secondary batteries of Comparative Example 1 and Comparative Example 2 use the positive electrode active materials of Comparative Example 1 and Comparative Example 2 with the amount of reacted lithium carbonate in the first precursor of less than 92 mass % as the positive electrodes in the second precursor forming step. Consequently, although the lithium ion secondary batteries of Comparative Example 1 and Comparative Example 2 exhibited the comparatively high discharge capacity, the resistance increase rate became 40% or more. Thus, the properties worsened compared with the results of the lithium ion secondary batteries from Working Example 1 to Working Example 13. It has been found that since the discharge capacity of Comparative Example 3 was the capacity lower than those of Working Example 1 to Working Example 13, adjusting only the temperature at the finishing heat treatment step cannot obtain the excellent positive electrode active material.

As described above, it was able to be confirmed that Working Example 1 to Working Example 18 based on the method for producing the positive electrode active material and the positive electrode active material of the present invention can obtain the positive electrode active material that features the high capacity, the low resistance increase rate, and the excellent charge/discharge cycle characteristics.

While the embodiments of the present invention have been described in detail with reference to the drawings, the specific configuration is not limited to the embodiments. Design changes and the like within a scope not departing from the gist of the present invention are included in the present invention.

REFERENCE SIGNS LIST

100 Non-aqueous secondary battery (lithium ion secondary battery)
111 Positive electrode
S1 Mixing step
S2 Firing step
S21 First precursor forming step
S22 Second precursor forming step
S23 Finishing heat treatment step

The invention claimed is:

1. A method for producing positive electrode active material for lithium ion secondary batteries, the method comprising:
   a mixing step of weighing and mixing a lithium carbonate and a compound containing respective metallic elements other than Li in Formula (1), $Li_\alpha Ni_x Co_y M1_{1-x-y-z} M2_z O_{2+\beta}$, so as to have a metallic constituent ratio of a composition formula in accordance with the Formula (1) to obtain a mixture,
   where values in the Formula (1) meet: $0.97 \leq \alpha \leq 1.08$, $-0.1 \leq \beta \leq 0.1$, $0.7 < x \leq 0.9$, $0.03 \leq y \leq 0.3$, $0 \leq z \leq 0.1$, and $0 < 1-x-y-z$, M1 is at least one kind of an element selected from the group consisting of Mn and Al, and M2 is at least one kind of an element selected from the group consisting of Mg, Ti, Zr, Mo, and Nb; and
   a firing step of firing the mixture to obtain a lithium composite compound expressed by the Formula (1),
   wherein the firing step includes:
      a first precursor forming step of performing a heat treatment on the mixture at a heat treatment temperature of 200° C. or more and 400° C. or less for 0.5 hours or more and 5 hours or less to obtain a first precursor;
      a second precursor forming step of performing a heat treatment on the first precursor under an oxidizing atmosphere at a heat treatment temperature of 450° C. or more and 800° C. or less for 0.5 hours or more and 50 hours or less, the second precursor forming step reacting 92 mass % or more of the lithium carbonate to obtain a second precursor;
      a measurement step that includes measuring an amount of reacted lithium carbonate in the second precursor after the second precursor forming step; and
      a finishing heat treatment step of performing a heat treatment on the second precursor under an oxidizing atmosphere at a heat treatment temperature of 755° C. or more and 900° C. or less for 0.5 hours or more and 50 hours or less to obtain the lithium composite compound.

2. The method for producing positive electrode active material for lithium ion secondary batteries according to claim 1,
   wherein the heat treatment temperature in the finishing heat treatment step is 840° C. or more and 890° C. or less.

3. The method for producing positive electrode active material for lithium ion secondary batteries according to claim 1,
   wherein the second precursor forming step forms the second precursor such that 97 mass % or more of the lithium carbonate has reacted, the lithium carbonate being contained in the mixture weighed and mixed so as to have the metallic constituent ratio of the composition formula in the Formula (1).

4. The method for producing positive electrode active material for lithium ion secondary batteries according to claim 1,
   wherein the heat treatment temperature in the second precursor forming step is 600° C. or more and 700° C. or less.

5. The method for producing positive electrode active material for lithium ion secondary batteries according to claim 1,
   wherein the M1 in the Formula (1) is Mn, $0.04 \leq 1-x-y-z \leq 0.18$ being met.

6. The method for producing positive electrode active material for lithium ion secondary batteries according to claim 1,
   wherein the lithium composite compound is not water-washed after the finishing heat treatment step.

7. The method for producing positive electrode active material for lithium ion secondary batteries according to claim 1, the method comprising
   a step of performing a water washing on the lithium composite compound after the finishing heat treatment step.

8. The method for producing positive electrode active material for lithium ion secondary batteries according to claim 7, the method comprising
   a step of performing a drying at least once or more after the step of performing the water washing.

* * * * *